US012741386B2

(12) United States Patent
Chowdhury

(10) Patent No.: US 12,741,386 B2
(45) Date of Patent: Sep. 22, 2026

(54) ELECTROADHESIVE PADS, ELECTROADHESIVE END EFFECTORS, AND METHODS OF PRODUCING THE SAME

(71) Applicant: The Boeing Company, Chicago, IL (US)

(72) Inventor: Nayeem Chowdhury, Melbourne (AU)

(73) Assignee: The Boeing Company, Arlington, VA (US)

( * ) Notice: Subject to any disclaimer, the term of this patent is extended or adjusted under 35 U.S.C. 154(b) by 1044 days.

(21) Appl. No.: 17/944,871

(22) Filed: Sep. 14, 2022

(65) Prior Publication Data

US 2024/0083043 A1 Mar. 14, 2024

(51) Int. Cl.
*B25J 15/00* (2006.01)

(52) U.S. Cl.
CPC .................................. *B25J 15/0085* (2013.01)

(58) Field of Classification Search
CPC ...... B25J 15/0085; B25J 19/007; B25J 19/00; B25J 11/00; B25B 11/00
USPC ........................................................ 361/234
See application file for complete search history.

(56) References Cited

U.S. PATENT DOCUMENTS 9,925,670 B2 3/2018 Eisele et al.
9,969,131 B2 5/2018 Samak Sangari et al.
10,852,825 B2 * 12/2020 Yoon ....................... G06F 3/014
10,875,191 B2 12/2020 Hwang et al.
10,919,158 B2 * 2/2021 Hart ........................ G01L 5/228
12,578,570 B2 * 3/2026 Balili .................... G02B 26/005
2008/0089002 A1 * 4/2008 Pelrine .................. H02N 13/00 361/234
2015/0021944 A1 1/2015 Miwa et al.
(Continued)

FOREIGN PATENT DOCUMENTS

CN 114932568 A 5/2022
DE 102015002773 A1 9/2015
GB 2552450 A 1/2018

OTHER PUBLICATIONS

European Patent Office, Extended European Search Report in related application EP23196891, Apr. 3, 2025.
(Continued)

*Primary Examiner* — Dharti H Patel
(74) *Attorney, Agent, or Firm* — Kolitch Romano Dascenzo Gates LLP

(57) ABSTRACT

The electroadhesive pad comprises a substrate, a first electrical network, and a second electrical network. The first electrical network comprises a first subset of electrodes and a first voltage source configured to apply an output voltage at a first polarity to the first subset of electrodes. The second electrical network comprises a second subset of electrodes and a second voltage source configured to apply the output voltage to the second subset of electrodes at a second polarity. The first and second voltage sources are disposed along a central region of the electroadhesive pad. The first and second subsets of electrodes are supported by the substrate and extend between the central region and a perimeter of the electroadhesive pad. The methods include producing a custom electrostatic pad by mapping a shape of the custom electroadhesive pad onto a stock electroadhesive pad and cutting the stock electroadhesive pad into the shape.

11 Claims, 9 Drawing Sheets

(56) References Cited

U.S. PATENT DOCUMENTS

| | | | | |
|---|---|---|---|---|
| 2016/0318190 | A1 * | 11/2016 | Prahlad | B25J 15/0085 |
| 2019/0047157 | A1 * | 2/2019 | Shintake | B65G 47/92 |
| 2019/0312528 | A1 * | 10/2019 | Schaler | H02N 1/002 |
| 2023/0179123 | A1 * | 6/2023 | Bain | B25J 15/0085 361/234 |
| 2023/0179124 | A1 * | 6/2023 | Bain | B25J 15/0085 361/234 |

OTHER PUBLICATIONS

European Patent Office, Partial European Search Report issued in related European patent application No. EP23196891, Feb. 7, 2024.

Machine-generated English language translation of German Patent Application Publication No. DE102015002773A1, Sep. 10, 2015.

* cited by examiner

ELECTROADHESIVE PADS, ELECTROADHESIVE END EFFECTORS, AND METHODS OF PRODUCING THE SAME

FIELD

The present disclosure relates to electroadhesive pads, electroadhesive end effectors, and methods of producing the same

BACKGROUND

Electroadhesion, or electrostatic adhesion, refers to an adhesive interaction between two bodies that is produced by an electrostatic attraction therebetween. Electroadhesion has found unique advantages in numerous applications, such as robotics and grippers, in part because it represents one of a small number of adhesive interactions that can be directly controlled electrically. Electroadhesive mechanisms typically include an electroadhesive unit, such as an electroadhesive pad or electroadhesive tape, that is configured to produce an electrical field responsive to an applied voltage. When the electroadhesive unit is placed proximate to, or in contact with, an object, the produced electrical field will polarize the object and generate an electrostatic attraction therebetween. To this end, electroadhesive units typically include electrodes of opposite polarity that are distributed along a substrate and that produce the electrical field when a voltage is applied therebetween.

In many applications, electroadhesive units are dimensioned with a particular geometry that, for example, is selected to match the region of an object that the electroadhesive unit is configured to engage. Conventionally, however, electroadhesive units are wired with the input current path routed from an outer edge of the electroadhesive unit towards a center or an interior of the electroadhesive unit. Due to this construction, attempting to cut a conventional electroadhesive unit into a desired shape post manufacturing typically will sever the input current path and deactivate at least a substantial portion of the electroadhesive unit. Accordingly, manufacture of conventional electroadhesive units requires a new unit design for each unique shape, which can be costly and labor intensive especially in situations where multiple electroadhesive units with unique shapes are needed.

SUMMARY

Electroadhesive pads, methods of producing custom electroadhesive pads, and methods of producing electroadhesive end effectors are disclosed herein. The electroadhesive pads comprise a substrate, a first electrical network, and a second electrical network. The first electrical network comprises a first subset of electrodes and a first voltage source that is electrically connected to the first subset of electrodes and configured to apply an output voltage at a first polarity to the first subset of electrodes. The second electrical network comprises a second subset of electrodes and a second voltage source that is electrically connected to the second subset of electrodes and configured to apply the output voltage to the second subset of electrodes at a second polarity that is opposite the first polarity. The first voltage source and second voltage source are disposed along a central region of the electroadhesive pad. The first subset of electrodes and the second subset of electrodes each are supported by the substrate and extend between the central region and a perimeter of the electroadhesive pad.

The method of producing a custom electrostatic pad includes mapping a desired shape of the custom electroadhesive pad onto a stock electroadhesive pad and cutting the stock electroadhesive pad into the desire shape to produce the custom electroadhesive pad.

The methods of producing an electroadhesive end effector include obtaining a desired three-dimensional contour of the electroadhesive end effector, determining an arrangement of a plurality of electroadhesive pads that collectively create the desired three-dimensional surface contour, determining that a desired shape of one or more electroadhesive pads within the arrangement is different from a stock shape of a stock electroadhesive pad, and producing each custom electrostatic pad by mapping the desired shape of the custom electroadhesive pad onto the stock electroadhesive pad and cutting the stock electroadhesive pad into the desire shape.

DESCRIPTION

Figure 1:
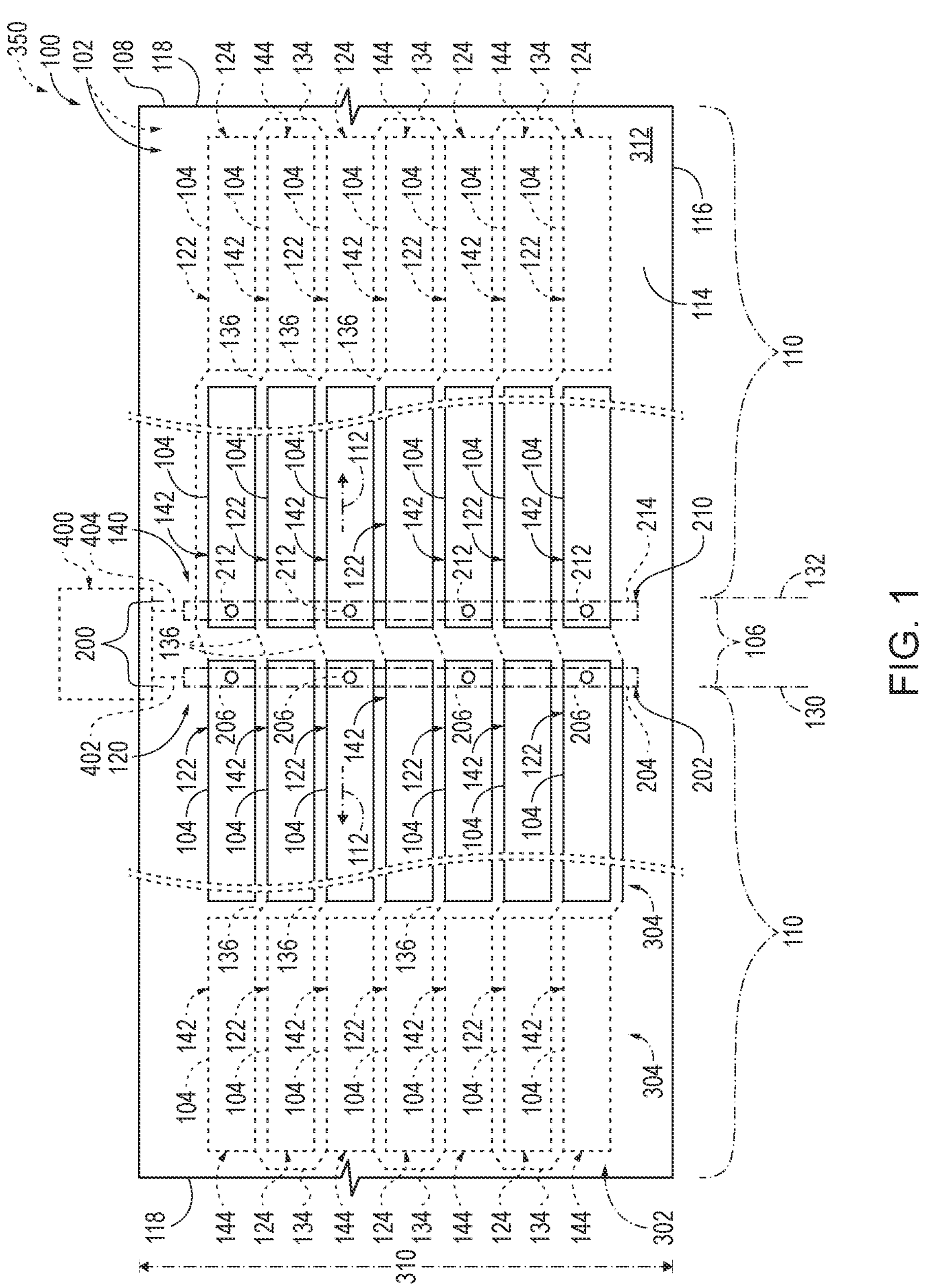
FIG. 1 is a schematic representation of examples of electroadhesive pads according to the present disclosure.

FIGS. 1-10 provide examples of electroadhesive pads 100, electroadhesive end effectors 350 comprising electroadhesive pads 100, and methods 500 according to the present disclosure. Elements that serve a similar, or at least substantially similar, purpose are labelled with like numbers in each of FIGS. 1-10, and these elements may not be discussed in detail herein with reference to each of FIGS. 1-10. Similarly, all elements may not be labeled in each of FIGS. 1-10, but reference numerals associated therewith may be utilized herein for consistency. Elements, components, and/or features that are discussed herein with reference to one or more of FIGS. 1-10 may be included in and/or utilized with any of FIGS. 1-10 without departing from the scope of the present disclosure.

Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure. Dot-dash lines may be used to indicate various virtual features and/or features that are schematically illustrated in a figure but that would not be nominally visible in the illustrated view. The features shown in dot-dashed lines may or may not be optional to the given example as will be understood from the discussion herein.

FIG. 1 is a schematic representation of examples of electroadhesive pads 100 according to the present disclosure. As shown, electroadhesive pad 100 includes a substrate 102, a plurality of electrodes 104 supported on substrate 102, and a voltage source assembly 200 that is provided along a central region 106 of electroadhesive pad 100 and that is configured to apply an output voltage to electrodes 104. More specifically, electroadhesive pad 100 comprises a first electrical network 120 and a second electrical network 140. Electrodes 104 include a first subset of electrodes 122 that are comprised in first electrical network 120 and a second subset of electrodes 142 that are comprised in second electrical network 140. Likewise, voltage source assembly 200 includes a first voltage source 202 that is comprised in first electrical network 120 and a second voltage source 210 that is comprised in second electrical network 140.

First voltage source 202 is electrically connected to first subset of electrodes 122 and is configured to apply an output voltage at a first polarity to the first subset of electrodes 122. Second voltage source 210 is electrically connected to second subset of electrodes 142 and is configured to apply the output voltage to the second subset of electrodes at a second polarity that is opposite to the first polarity. Accordingly, first voltage source 202 and second voltage source 210 together apply the output voltage to electrodes 104 but with one of first voltage source 202 and second voltage source 210 applying a positive voltage to the respective electrodes 104 and the other of first voltage source 202 and second voltage source 210 applying a negative voltage to the respective electrodes 104. First electrical network 120 may be electrically insulated from second electrical network 140, meaning that the components of first electrical network 120 (i.e., first subset of electrodes 122 and first voltage source 202) are electrically insulated from, or are separated by one or more electrical insulators from, the components of second electrical network 140 (i.e., second subset of electrodes 142 and second voltage source 210).

As utilized herein, an electrical network refers to a system of interconnected electrical components that may be connected in an open or closed path. Specifically, an electrical circuit is a type of electrical network that consists of a closed loop; however, electrical networks according to the present disclosure are not required to be circuits and may consist of nominally open current paths. That said, first electrical network 120 and second electrical network 140 together may form a complete circuit under operative conditions, in which first subset of electrodes 122 and second subset of electrodes 142 can be regarded as forming a plurality of capacitors that connect the two networks via an object engaged with and/or in close proximity to electroadhesive pad 100.

Voltage source assembly 200 is configured to interconnect electroadhesive pad 100 with a power supply 400 that is configured to provide electrical power to electroadhesive pad 100 at the output voltage. Power supply 400 may be included in (e.g., on-board) electroadhesive pad 100, or power supply 400 may be provided separately from electroadhesive pad 100. For example, power supply 400 may include a direct current (DC) power supply that is configured to supply DC power to electroadhesive pad 100 via voltage source assembly 200. Examples of DC power supplies include one or more batteries and/or one or more rectifiers that receive alternating current (AC) power and convert the AC power to DC power. In some examples, power supply 400 comprises a first terminal 402 that provides the output voltage at the first polarity (e.g., a positive terminal) and a second terminal 404 that provides the output voltage at the second polarity (e.g., a negative terminal). In some such examples, during operation of electroadhesive pad 100, first voltage source 202 is interconnected with first terminal 402 of power supply 400 and second voltage source 210 is interconnected with second terminal 404 of power supply 400. As referred to herein, the output voltage may include the absolute sum of the voltages applied at the first and second terminals of power supply 400. Namely, the voltage applied to first voltage source 202 may or may not be equal in magnitude to the voltage applied to second voltage source 210.

When first voltage source 202 applies the output voltage to first subset of electrodes 122 at the first polarity, electrical charge of the first polarity (e.g., positive electrical charge) accumulates on first subset of electrodes 122 such that first subset of electrodes 122 produces a corresponding electrical field. Likewise, when second voltage source 210 applies the output voltage to second subset of electrodes 142 at the second polarity, electrical charge of the second polarity (e.g., negative electrical charge) accumulates on second subset of electrodes 142 and second subset of electrodes 142 produces a corresponding electrical field. When an object is brought in proximity to or in contact with electroadhesive pad 100, the electrical field produced by each electrode 104 causes at least a subsurface region of the object that is proximate the electrode 104 to be oppositely polarized. In this way, an electrostatic attractive force is generated between electrode 104 and the oppositely polarized region of the object that is beneath electrode 104. In other words, first subset of electrodes 122 polarizes regions of the object beneath first subset of electrodes 122 to the second (e.g., negative) polarity when first voltage source 202 applies the output voltage to first subset of electrodes 122 at the first polarity, and second subset of electrodes 142 polarizes regions of the object that are beneath second subset of electrodes 142 to the first (e.g., positive) polarity when second voltage source 210 applies the output voltage to second subset of electrodes 122 at the second polarity.

The net attractive force between electroadhesive pad 100 and an object may be the sum of the electrostatic attractive forces produced between each electrode 104 and the oppositely-polarized region of the object beneath each electrode 104. The net attractive force between electroadhesive pad 100 and an object also may be modulated, and/or turned on and off by controlling the power supplied to electrodes 104 by voltage source assembly 200. More specifically, voltage source assembly 200 may polarize electrodes 104 as discussed when voltage source assembly 200 is connected to power supply 400 (e.g., DC power supply). Electroadhesive pad 100 may be described as being electroadhesively, or electrostatically, engaged with an object when electrodes 104 are polarized as discussed herein such that a net attractive is produced between electroadhesive pad 100 and the object, and the net attractive force is, for example, sufficient to carry the object with electroadhesive pad 100.

Electroadhesive pad 100 additionally or alternatively may be referred to as electrostatic adhesive pad 100, electroadhesive gripper 100, and/or electroadhesive board 100. In some examples, electroadhesive pad 100 may be utilized as a gripper. That is, electroadhesive pad 100 may be configured to produce an electrostatic force between itself and an object that permits the object to be selectively picked up and transported with electroadhesive pad 100 when electrodes 104 are polarized by voltage source assembly 200 and selectively released by electroadhesive pad 100 when electrodes 104 are depolarized. As discussed in more detail herein, electroadhesive pad 100 may be comprised in an electroadhesive end effector 350 that is configured to be attached to and manipulated by a robotic arm. In such examples, electroadhesive end effector 350 may be utilized to perform pick-and-place operations, such as by selectively energizing and de-energizing electroadhesive pad 100. Electroadhesive pads 100 according to the present disclosure may be utilized to electroadhesively engage or grip objects formed of any suitable material, including conductive materials and non-conductive materials. As examples, electroadhesive pad 100 may be utilized to electroadhesively engage materials such as plastics, thermoplastics, composite materials, prepreg composite materials, metals, metal foils, paper, ceramics, polymers, etc.

With continued reference to FIG. 1, first voltage source 202 and second voltage source 210 each extend along central region 106 of electroadhesive pad 100. First subset of electrodes 122 and second subset of electrodes 142 each extend between central region 106 and a perimeter 108 of electroadhesive pad 100. More specifically, voltage source assembly 200 may be described as defining central region 106. Perimeter 108 at least partially, and optionally completely, defines the shape of and the outermost extent of electroadhesive pad 100. Electroadhesive pad 100 may be described as defining one or more middle regions 110 between central region 106 and perimeter 108, and electrodes 104 may be distributed along middle regions 110.

Electroadhesive pad 100 may define a frontal area that includes middle regions 110 and central region 106. In some examples, the frontal area of electroadhesive pad 100 corresponds to an area over which electroadhesive pad 100 is configured to operatively contact and electroadhesively engage an object. In some examples, central region 106 transects the frontal area of electroadhesive pad 100 and perimeter 108 defines a pair of perimeter sections 118 that are positioned on opposing sides of central region 106. In such examples, electroadhesive pad 100 includes a first middle region 110 that extends between a first side 130 of central region 106 and a corresponding perimeter section 118 of perimeter 108 and a second middle region 110 that extends between a second side 132 of central region 106 and a corresponding perimeter section 118 of perimeter 108, where first side 130 of central region 106 is opposed to second side 132 of central region 106.

In some examples, each middle region 110 defines at least a threshold fraction of the frontal area of electroadhesive pad 100. In some such examples, at least a threshold fraction of the frontal area of electroadhesive pad 100 is defined between each side of central region 106 and a respective perimeter section 118 of perimeter 108. As examples, the threshold fraction of each middle region 110 to the frontal area of electroadhesive pad 100 may be at least 10%, at least 20%, at least 30%, at least 40%, at least 50%, at least 60%, at least 70%, at least 80%, most 50% at most 60%, at most 70%, at most 80%, and/or at most 90%. In some examples, central region 106 at least substantially bisects the frontal area of electroadhesive pad 100. In some such examples, first middle region 110 and second middle region 110 each define at least substantially the same fraction of the frontal area of electroadhesive pad 100.

First electrical network 120 may be configured to convey electrical current through first subset of electrodes 122 in an outward direction 112 from central region 106 towards perimeter 108. Likewise, second electrical network 140 may be configured to convey electrical current through second subset of electrodes 142 in outward direction 112 from central region 106 towards perimeter 108 of electroadhesive pad 100. This is distinct from conventional electroadhesive pads, in which current is conveyed from the perimeter, or outer edge, of the pad towards the center of the pad.

Substrate 102 may be constructed from an electrically insulating material such that electrodes 104 are not electrically connected to one another by connection to substrate 102. As more specific examples, substrate 102 may be formed of one or more of a plastic, a polymer, a composite material, phenolic paper, a ceramic, a resin, an epoxy resin, a fiberglass reinforced resin, a polyimide, and a fluoropolymer. Substrate 102 also may be constructed to possess mechanical properties that are suitable for a particular application of electroadhesive pad 100. For example, substrate 102 may be rigid, semi-rigid, or flexible. The components of first electrical network 120 and second electrical network 140 (e.g., electrodes 104) may be formed from one or more electrically conducting materials, such as copper, gold, zinc, nickel aluminum, lead, tin, and/or alloys thereof. In some examples, electroadhesive pad 100 is constructed as a printed circuit board (PCB), with the components of first electrical network 120 and second electrical network 140 being comprised in one or more conductive layers and substrate 102 forming an insulating layer.

First electrical network 120 and second electrical network 140 together may include a double layer construction or a multi-layer construction. More specifically, in some examples, substrate 102 comprises an electrode side 114 along which electrodes 104 are distributed and an opposed side 116 that is opposed to electrode side 114. At least a portion of voltage source assembly 200 is supported within electroadhesive pad 100 spaced apart from electrode side 114 such that voltage source assembly 200 may interconnect with first subset of electrodes 122 separately from second subset of electrodes 142. For some examples in which first electrical network 120 and second electrical network 140 together comprise a double layer construction, a portion of each of first voltage source 202 and second voltage source 210 are supported on opposed side 116 of substrate 102. For some examples in which first electrical network 120 and second electrical network 140 together comprise a multi-layer construction, a portion of one of first voltage source 202 and second voltage source 210 is supported on opposed side 116 of substrate 102 and a portion of the other of first voltage source 202 and second voltage source 210 is supported spaced apart from each of electrode side 114 and opposed side 116 of substrate 102. For example, a portion of first voltage source 202 and second voltage source 210 may be embedded within substrate 102. Additionally or alternatively, electroadhesive pad 100 may include a second substrate 102 that is attached to opposed side 116 of substrate 102 and a portion of first voltage source 202 and second voltage source 210 may be disposed along opposed side 116 of second substrate 102. As yet another example, first subset of electrodes 122 and second subset of electrode 142 may be supported on separate substrates 102 in a multi-layer construction.

For examples in which first electrical network 120 and second electrical network 140 together comprise a double layer construction, electroadhesive pad 100 may be constructed as a double-layer PCB. Conversely, for examples in which first electrical network 120 and/or second electrical network 140 comprises a multi-layer construction, electroadhesive pad 100 may be constructed as a multi-layer PCB, which includes more than two conductive layers.

As shown in FIG. 1, in some examples, first voltage source 202 comprises a plurality of first voltage source leads 206 that are positioned along central region 106, with each first voltage source lead 206 being directly electrically connected with a respective electrode 104 of first subset of electrodes 122. In some examples, first voltage source 202 further comprises a first voltage source rail 204 that extends along central region 106 and that electrically connects first voltage source leads 206 to one another. First voltage source rail 204 may electrically connect first voltage source leads 206 in parallel, and first voltage source rail 204 may be configured to connect to first electrical network 120 to first terminal 402 of the of power supply 400.

In some examples, second voltage source 210 comprises a plurality of second voltage source leads 212 that are positioned along central region 106, with each second voltage source lead 212 being directly electrically connected with a respective electrode 104 of second subset of electrodes 142. In some such examples, second voltage source 210 further comprises a second voltage source rail 214 that extends along a central region 106 of electroadhesive pad 100 and that electrically connects second voltage source leads 212 to one another. Second voltage source rail 214 may electrically connect second voltage source leads 212 in parallel, and second voltage source rail 214 may be configured to connect to second electrical network 140 to second terminal 404 of the of power supply 400.

As indicated in dot-dash lines in FIG. 1, in some examples, first voltage source rail 204 extends along and/or is supported on opposed side 116 of substrate 102, and each first voltage source lead 206 extends through substrate 102 from opposed side 116 to electrode side 114. Likewise, in some examples, second voltage source rail 214 extends along and/or is supported on opposed side 116 of substrate 102 and each second voltage source lead 212 extends through substrate 102 from opposed side 116 to electrode side 114. For examples in which first voltage source rail 204 and second voltage source rail 214 are supported on opposed side 116 of substrate 102, first electrical network 120 and second electrical network 140 together may be described as having a double layer construction, and electroadhesive pad 100 may be constructed as a double layer PCB. Additionally or alternatively, one of first voltage source rail 204 and second voltage source rail 214 may be positioned spaced apart from opposed side 116 and electrode side 114 (e.g., embedded in substrate 102 or supported on opposed side 116 of second substrate 102), in which case first electrical network 120 and second electrical network 140 together may be described as having a multi-layer construction.

In any such examples, first voltage source rail 204 and second voltage source rail 214 may be spaced apart from electrodes 104 by substrate 102. In this way, first voltage source rail 204 may electrically connected to first subset of electrodes 122 via first voltage source leads 206 and cross over second subset of electrodes 142 while being electrically insulated therefrom. Likewise, second voltage source rail 214 may electrically connect to second subset of electrodes 142 via second voltage source leads 212 and cross over first subset of electrodes 122 while being electrically insulated therefrom. For similar reasons, first voltage source rail 204 and second voltage source rail 214 are electrically insulated from one another. For example, first voltage source rail 204 and second voltage source rail 214 may be laterally spaced apart from one another, such as for examples in which first voltage source rail 204 and second voltage source rail 214 are disposed along opposed side 116 of substrate. In some such examples, first voltage source rail 204 defines first side 130 of central region 106 and second voltage source rail 214 defines second side 132 of central region 106.

Electroadhesive pad 100 may include any suitable conformation that is based on, for example, the particular application of electroadhesive pad 100. In some examples, substrate 102 is planar, or at least substantially planar. However, it also is within the scope of the present disclosure that substrate 102 may have a non-planar conformation, such as an arcuate, convex, concave, saddle, or a more complex non-planar conformation. In some examples, electrodes 104 follow, or at least generally follow, the contour of substrate 102 such that electrodes 104 are distributed in a planar array for examples in which electroadhesive pad 100 is planar.

Electroadhesive pad 100 defines an electroadhesive face 312 along which electroadhesive pad 100 is configured to contact and electroadhesively engage an object during operation. In some examples, electrodes 104 or substrate 102 define the contour of electroadhesive face 312 and perimeter 108 defines the shape of electroadhesive face 312. The shape of electroadhesive face 312 may be selected based on the particular application of electroadhesive pad 100, such as based on the location of electroadhesive pad 100 within an array of electroadhesive pads 100 within an electroadhesive end effector 350, as discussed in more detail herein. FIG. 1 schematically illustrates electroadhesive face 312 as having a rectangular shape. However, it is within the scope of the present disclosure that electroadhesive face 312 may include any suitable shape. As examples, electroadhesive face 312 may include a triangular shape, a polygonal shape, regular polygonal shape, a pentagonal shape, a hexagonal shape, an octagonal shape, a circular shape, and/or an elliptical shape. Similarly, while FIG. 1 schematically represents each electrode 104 as having a rectangular shape, it is within the scope of the present disclosure that electrodes 104 may comprise any suitable shape, such as any of the shapes discussed herein in connection to electroadhesive face 312.

As shown in FIG. 1, electrodes 104 are supported on electrode side 114 spaced apart from one another such that first subset of electrodes 122 are electrically insulated from second subset of electrodes 142. In some examples, electrodes 104 are arranged in a two dimensional lattice, or array, (i.e., accounting for any non-planar contour of electroadhesive face) and the particular type of lattice in which electrodes 104 are arranged in may be selected based on, for example, the shape of electrodes 104. For example, electrodes 104 may be arranged in a rectangular lattice, or a grid, for examples in which electrodes 104 comprise a rectangular shape. In some examples, first subset of electrodes 122 are arranged in an alternating relationship with second subset of electrodes 142 between central region 106 and perimeter 108. In some examples, alternating first subset of electrodes 122 with second subset of electrodes 142 in this manner enhances the electrical field strength therebetween when electroadhesive pad 100 electroadhesively engages an object.

In some examples, electrodes 104 are arranged in a grid of rows 302 and columns 304, with columns 304 running parallel to central region 106 and rows 302 running normal to columns 304 and central region 106. In some such examples, first subset of electrodes 122 are arranged in an alternating relationship with second subset of electrodes 142 within each column 304 and within each row 302. In this way, each electrode 104 of the subset of electrodes 122 is directly adjacent to electrodes 104 of second subset of electrodes 142 within each column 304 and within each row 302. Likewise, adjacent electrodes 104 of the subset of electrodes 122 are positioned diagonally relative to one another and adjacent electrodes 104 of second subset of electrodes 142 are positioned diagonally relative to one another.

In some examples, electrodes 104 are arranged in a plurality of branches that comprise a plurality of first subset branches 124 and a plurality of second subset branches 144. The electrodes 104 of a given branch are electrically connected to one another via branch connections 136, and each branch may extend from central region 106 to perimeter 108. Each first subset branch 124 is directly connected to a respective first voltage source lead 206 and comprises two or more electrodes 104 of first subset of electrodes 122 that are connected in series with one another. Likewise, each second subset branch 144 is directly connected to a respective second voltage source lead 212 and comprises two or more electrodes 104 of second subset of electrodes 142. In some examples, first subset branches 124 and second subset branches 144 are arranged in an alternating pattern along a length 310 of electroadhesive pad 100.

In some examples, each branch crosses over central region 106 such as to extend generally in outward direction 112 from the opposing sides of central region 106 and towards pair of perimeter sections 118. Specifically, first subset branch 124 may include a first electrode 104 that extends from first side 130 of central region 106 and that is connected to first voltage source lead 206, and a second electrode 104 that extends from second side 132 of central region 106 and that is connected to the first electrode 104 by a branch connection 136 that spans central region 106. In some examples, first subset branch 124 further includes one or more electrodes 104 that are connected in series via branch connection(s) 136 to the first electrode 104 and that extend towards the corresponding perimeter section 118 therefrom and/or one or more electrodes 104 connected in series to the second electrode 104 and that extend towards the corresponding perimeter section 118 therefrom.

Likewise, in some examples, second subset branch 144 comprises a first electrode 104 that extends from first side 130 of central region 106 and that is connected by a branch connection 136 which spans central region 106 to a second electrode 104 that extends from second side 132 of central region 106, where the second electrode 104 is connected to a second voltage source lead 212. In some examples, second subset branch 144 further comprises one or more electrodes 104 connected in series via branch connection(s) 136 to the first electrode 104 and extend towards the corresponding perimeter section 118 therefrom and/or one or more electrodes 104 connected in series via branch connection(s) 136 to the second electrode 104 and extend towards the corresponding perimeter section 118 therefrom.

In some examples, first electrical network 120 comprises a plurality of first subset perimeter connections 134 that electrically connect outside ends of adjacent first subset branches 124 to one another. As mentioned, adjacent first subset branches 124 may be interposed or spaced apart from one another by a second subset branch 144. As such, each first subset perimeter connections 134 may extend around the outside end of a second subset branch 144 that is between the adjacent first subset branches 124. As referred to herein, the outside end of a given branch refers to the end of the branch that is nearest to perimeter 108.

In some examples, second electrical network 140 comprises a plurality of second subset perimeter connections 134 that electrically connect outside ends of adjacent second subset branches 144 to one another. As discussed with respect to first subset branches 124, each second subset perimeter connection 134 may extend around the outside end of a first subset branch 124 that is between the adjacent second subset branches 144 that second subset perimeter connection 134 interconnects. Because first subset branches 124 and second subset branches 144 may be comprised in a common conductive layer, first subset perimeter connections 134 and second subset perimeter connections 134 may be provided on opposing sides of electroadhesive pad 100 such that first subset perimeter connections 134 and second subset perimeter connections 134 do not cross over one another. In some examples, perimeter connections 134 define and/or extend immediately adjacent to perimeter 108.

Electroadhesive pad 100 is configured to be cut, or severed, through middle regions 110 and maintain electrical connection between voltage source assembly 200 and at least a portion of the electrodes 104 that are positioned inside of the cut. In this context, "inside of" the cut means between the cut and the central region 106. Electroadhesive pad 100 is configured to do so at least in part because voltage source assembly 200 is disposed along central region 106 of electroadhesive pad 100 and first electrical network 120 and second electrical network 140 are configured to direct electrical current through electrodes 104 in outward direction 112 from central region 106. As more specific examples, electroadhesive pad 100 may be configured to maintain electrical connection between voltage source assembly 200 and at least a substantial portion, at least 90% of, at least 95% of, and/or all of, the electrodes 104 that are positioned inside of a cutline along which electroadhesive pad 100 is severed. Stated in slightly different terms, electroadhesive pad 100 may be configured to maintain electrical connection between voltage source assembly 200 and at least a substantial portion, at least 90% of, at least 95% of, and/or 100% of a total electrode area defined by electrodes 104 inside of the cutline.

By contrast, the voltage sources in conventional electroadhesive pads typically are disposed along opposing edges of the pad such that electrical current is routed inwardly through the electrodes from the opposing edges towards the center of the pad. Accordingly, attempting to cut a conventional electroadhesive pad along a middle region thereof necessarily will entail cutting between electrodes and the perimeter-disposed voltage source, thereby severing the connection between the electrodes and the voltage source and deactivating the region of the pad along which the cut is made.

In view of the above, electroadhesive pad 100 may be configured to be cut into a different, or desired, shape post-production, i.e., with first electrical network 120, second electrical network 140, and voltage source assembly 200 attached to substrate 102. This may enable electroadhesive pads 100 according to the present disclosure to be manufactured with a stock shape, or in stock dimensions, and subsequently cut to a custom or desired shape as-needed. This is in contrast to conventional electroadhesive pads which must be formed in the desired shape during manufacture.

Figure 2:
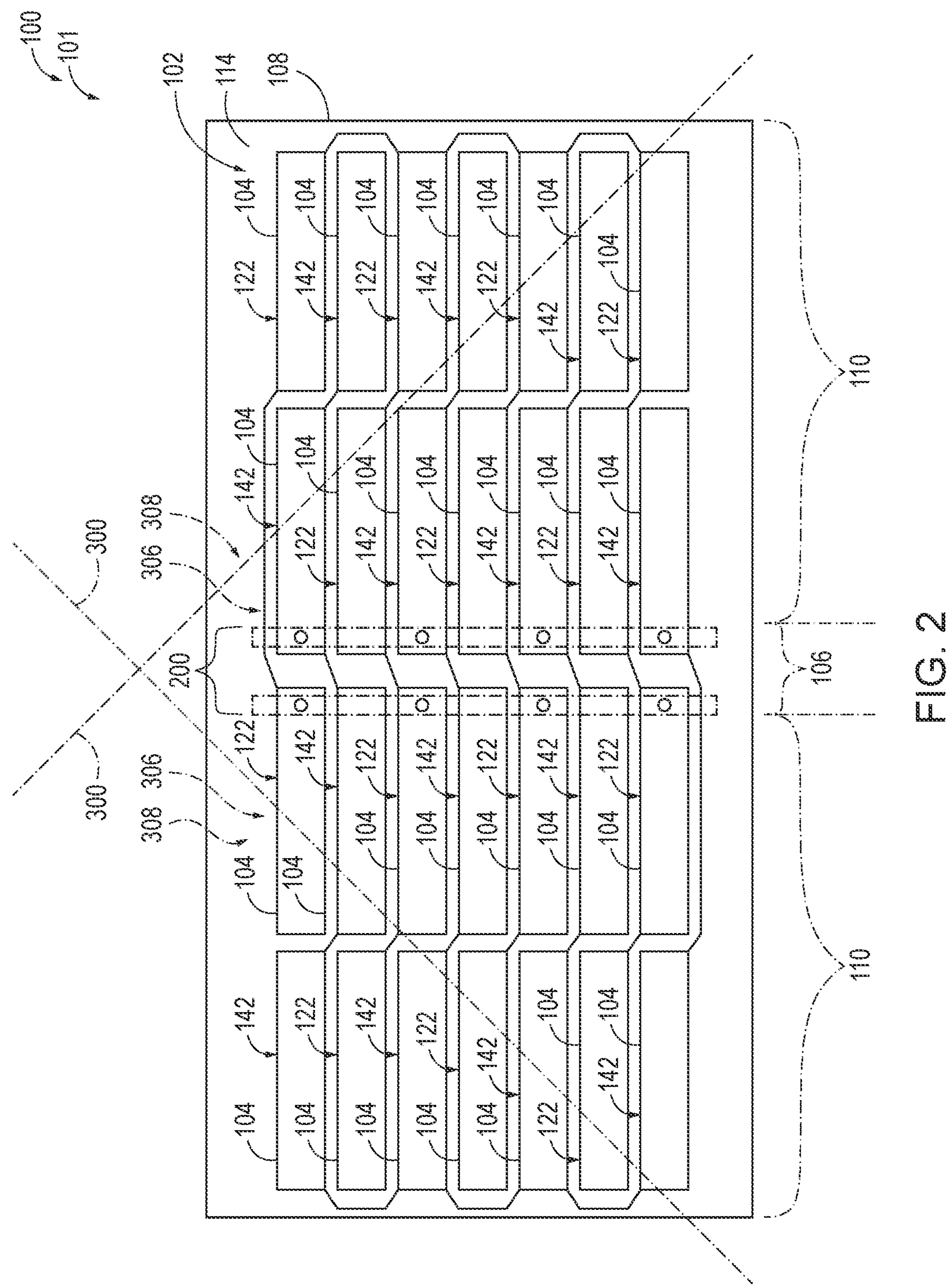
FIG. 2 is a schematic representation of examples of stock electroadhesive pads according to the present disclosure.
Figure 3:
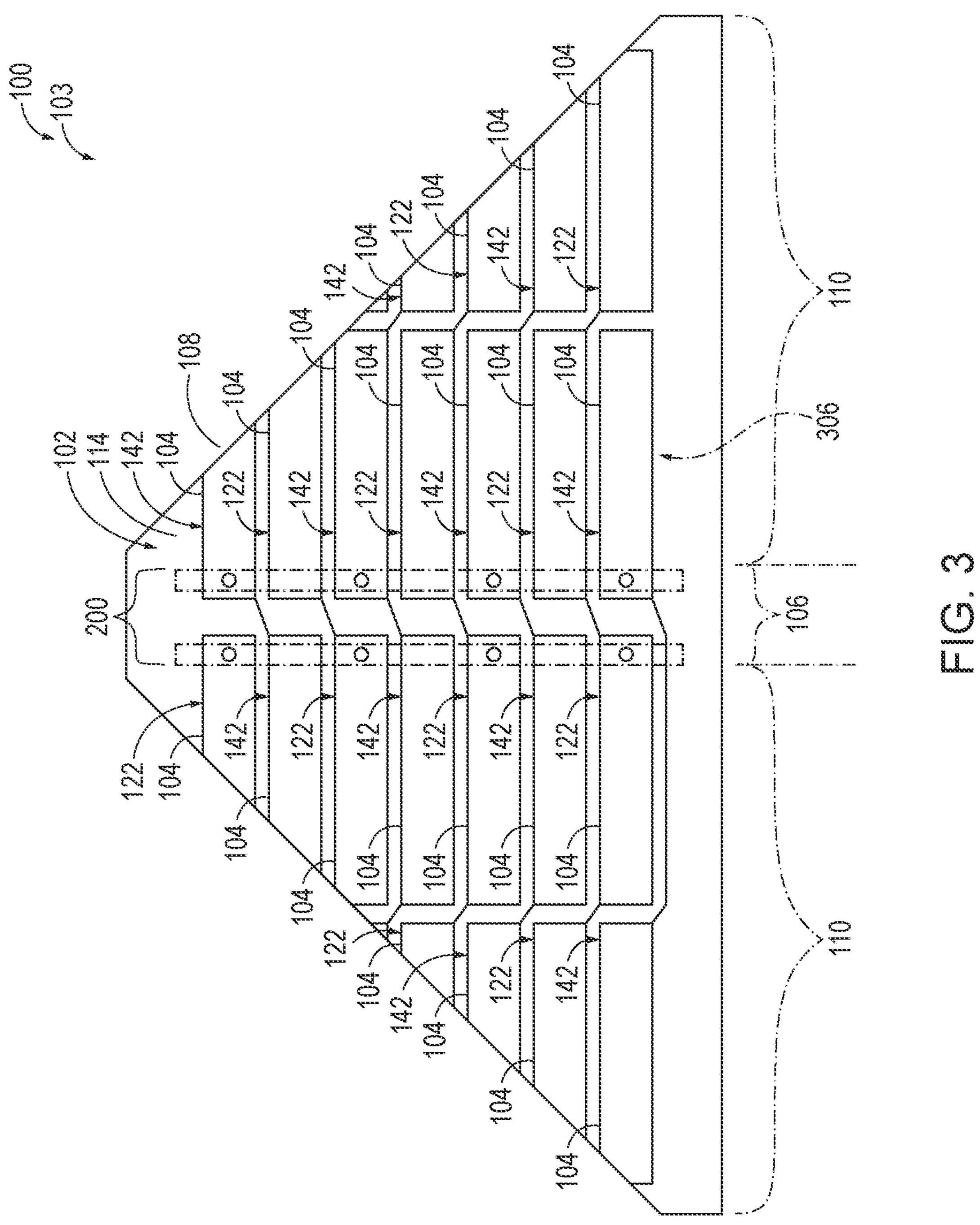
FIG. 3 is a schematic representation of examples of custom electroadhesive pads according to the present disclosure.

Turning focus to FIGS. 2-3, FIG. 2 is a schematic representation of examples of electroadhesive pads 100 in the form of a stock electroadhesive pad 101, and FIG. 3 is a schematic representation of electroadhesive pads 100 in the form of a custom electroadhesive pad 103 according to the present disclosure. Stock electroadhesive pad 101 and custom electroadhesive pad 103 each are electroadhesive pads 100 and may include any of the features, functions, components, etc. of electroadhesive pads 100 that are discussed herein in connection to FIG. 1.

Namely, as shown, stock electroadhesive pad 101 and custom electroadhesive pad 103 each comprise substrate 102, electrodes 104 (e.g., supported on electrode side 114 of substrate 102), and voltage source assembly 200. In this example, electrodes 104 of stock electroadhesive pad 101 are arranged in four columns 304, two on either side of central region 106, and seven rows 302, with first subset of electrodes 122 and second subset of electrodes 142 alternating in each row 302 and column 304, as discussed herein. Stock electroadhesive pad 101 includes a stock perimeter 108 that defines a stock shape of stock electroadhesive pad 101. For example, stock electroadhesive pad 101 may be one of a plurality of stock electroadhesive pads 101 that are manufactured with the same stock shape and the same stock dimensions, as defined by stock perimeter 108. Accordingly, stock electroadhesive pad 101 additionally or alternatively may be referred to as a standard electroadhesive pad 101, an as-manufactured electroadhesive pad 101, and/or a standard design electroadhesive pad 101.

Stock electroadhesive pad 101 is configured to be converted into custom electroadhesive pad 103 by cutting stock electroadhesive pad 101 into the shape and dimensions of custom electroadhesive pad 103. As shown in FIG. 2, this may include cutting stock electroadhesive pad 101 along one or more cutlines 300 that extend through middle region 110 of stock electroadhesive pad 101. Electrodes 104 extend between central region 106 and perimeter 108 and are distributed along middle region 110. Cutlines 300 may define in stock electroadhesive pad 101 one or more retained regions 306 that are positioned inside of cutlines 300 and one or more severed regions 308 that are defined outside of cutline(s) 300. In this context, "outside" of cutline 300 means between cutline 300 and perimeter 108. "Inside" of cutline 300 defines a region that includes central region 106 and the region between cutline 300 and central region 106.

To convert stock electroadhesive pad 101 to custom electroadhesive pad 103, stock electroadhesive pad 101 is cut along cutline(s) 300 and severed region(s) 308 are removed from retained region(s) 306 such that retained regions 306 are comprised in custom electroadhesive pad 103 and each cutline 300 defines a portion of a custom perimeter 108 of custom electroadhesive pad 103. Due to the construction of electroadhesive pads 100 according to the present disclosure as discussed herein, at least a substantial portion of, and optionally all of, electrodes 104 within retained region(s) 306 remain in electrical connection with voltage source assembly 200 when stock electroadhesive pad 101 is cut into custom electroadhesive pad 103. This includes electrodes 104 that are cut or severed along cutline 300 as a result of being positioned partially in each of retained region 306 and severed region 308.

FIGS. 4-9 provide illustrative, non-exclusive examples of electroadhesive pads 100 that are indicated at and referred to herein as electroadhesive pads 470. FIGS. 4-9 also provide examples of electroadhesive end effectors 350 comprising a plurality of the example electroadhesive pads 470. Where appropriate, the reference numerals from the schematic illustrations of FIGS. 1-3 are used to designate corresponding parts of FIGS. 4-9; however, the examples of FIGS. 4-9 are non-exclusive and do not limit electroadhesive pads 100 to the illustrated embodiments of FIGS. 4-9. That is, electroadhesive pads 100 are not limited to the specific embodiments of the illustrated electroadhesive pad 470, and electroadhesive pads 100 may incorporate any number of the various aspects, configurations, characteristics, properties, etc. of electroadhesive pads 100 that are illustrated in and discussed with reference to the schematic representations of FIGS. 1-3 and/or the embodiments of FIGS. 4-9, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to FIGS. 4-9; however, it is within the scope of the present disclosure that the previously discussed features, variants, etc. may be utilized with the examples of FIGS. 4-9.

Figure 4:
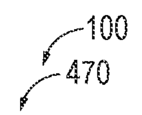
FIG. 4 is a plan view showing a less-schematic example of an electroadhesive pad according to the present disclosure.
Figure 4:
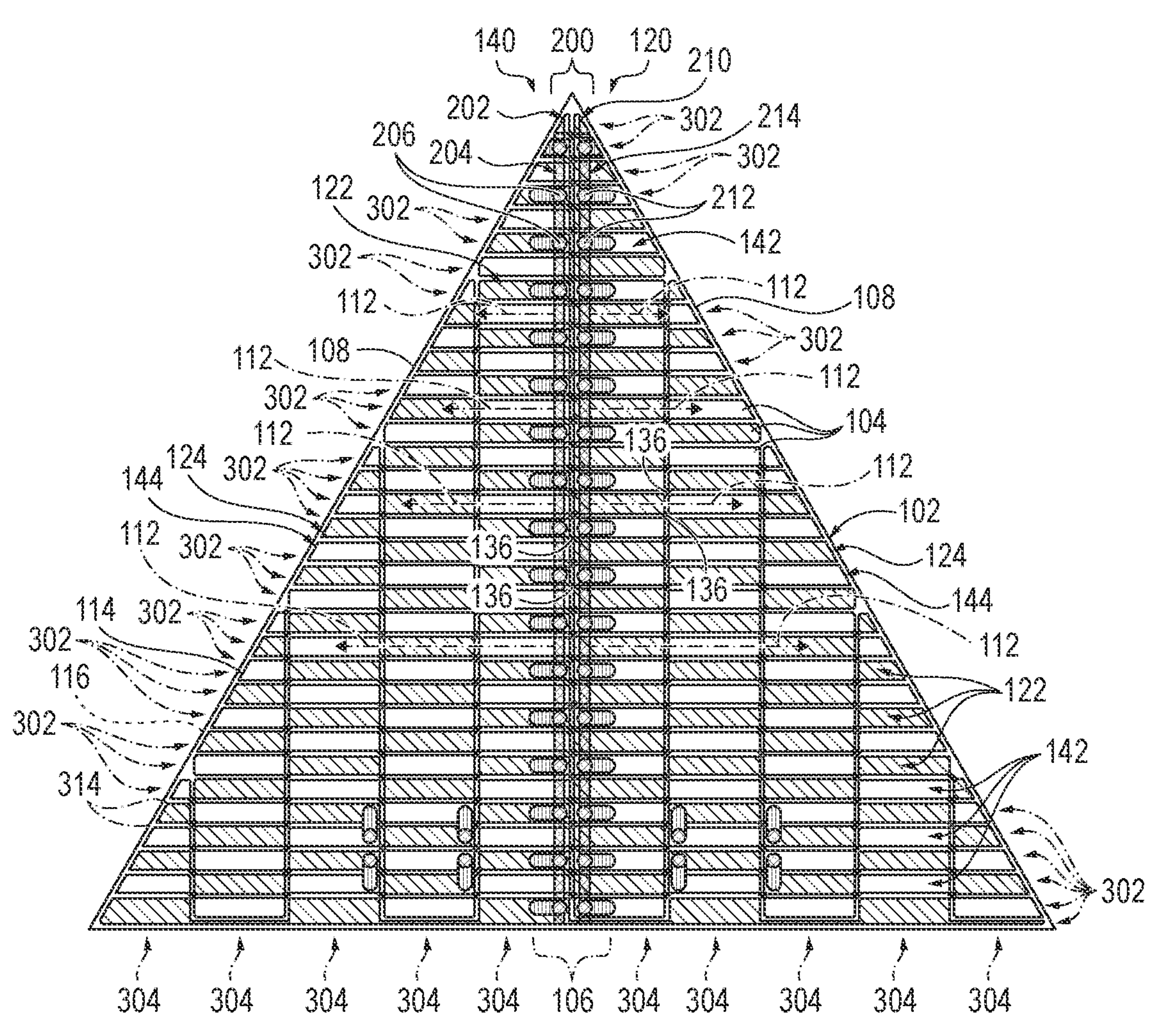

FIG. 4 is a plan view of electroadhesive pad 470. With initial reference to FIG. 4, electroadhesive pad 470 comprises substrate 102 and electrodes supported on electrode side 114 of substrate 102. Substrate 102 comprises a planar conformation and electrodes 104 are arranged in columns 304 and rows 302 along electrode side 114 of substrate 102. Electrodes 104 include first subset of electrodes 122 and second subset of electrodes 142. First subset of electrodes 122 are filled with cross-hatches for sake of illustration. First subset of electrodes 122 and second subset of electrodes 142 are alternating with one another in each column 304 and row 302. First subset of electrodes 122 and second subset of electrodes 142 also are respectively arranged in first subset branches 124 and second subset branches 144, which are alternating with one another along the length of electroadhesive pad 470. The electrodes 104 of a given branch are electrically connected by branch connections 136, as discussed herein.

Voltage source assembly 200 extends along and defines central region 106. Voltage source assembly 200 includes first voltage source 202, which is electrically connected to first subset of electrodes 122 via first voltage source leads 206 and second voltage source 210, which is electrically connected to second subset of electrodes 142 via second voltage source leads 212. Specifically, first voltage source 202 includes first voltage source rail 204 and second voltage source 210 includes second voltage source rail 214. First voltage source rail 204 and second voltage source rail 214 are provided along opposed side 116 of substrate and illustrated in cross-hatch for this reason. Each first subset branch 124 is connected to first voltage source rail 204 via a respective first voltage source lead 206, and each second subset branch 144 is connected to second voltage source rail 214 via a respective second voltage source lead 212.

Each branch extends from central region 106 to perimeter 108 of stock electroadhesive pad. In this example, electroadhesive pad 470 and perimeter 108 thereof comprise a triangular shape. As shown in dot-dash lines, first electrical network 120 is configured to convey electrical current in outward direction 112 through first subset of electrodes 122 and second electrical network 140 is configured to convey electrical current in outward direction 112 through second subset of electrodes 142.

Figure 5:
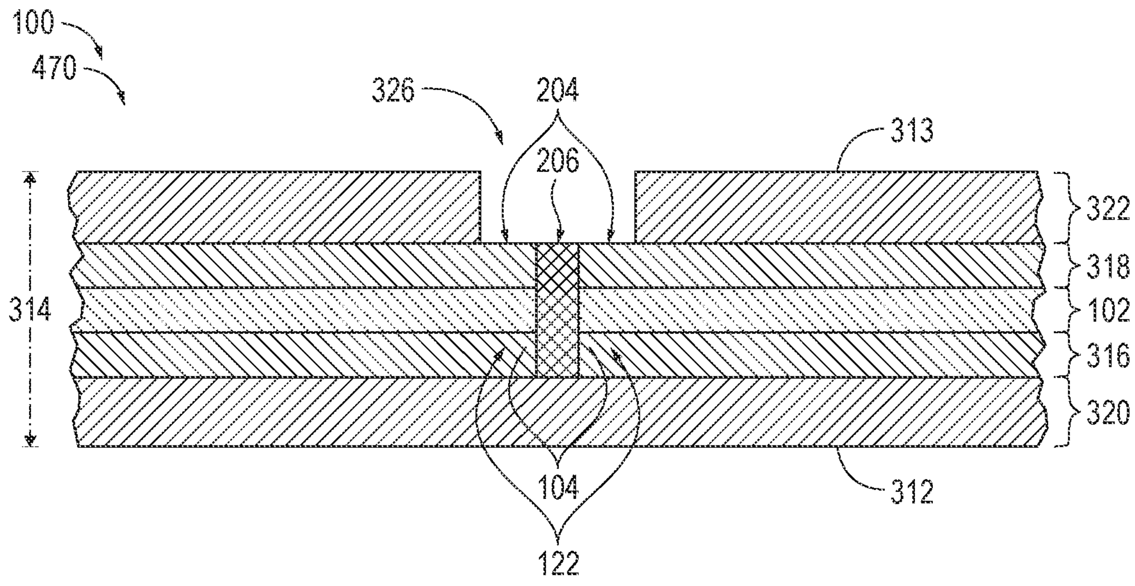
FIG. 5 is a cross-sectional view of the example electroadhesive pad of FIG. 4.

FIG. 5 is a partial cross-sectional view taken through a pad thickness 314 of electroadhesive pad 470 and through a first voltage source lead 206 and an electrode 104 of first subset of electrodes 122. As shown, electroadhesive pad 100 includes a first conductive layer 316, second conductive layer 318, and substrate 102 which interposes first conductive layer 316 and second conductive layer 318. Electrodes

104 are comprised in first conductive layer 316. First voltage source rail 204 and second voltage source rail 214 (not shown) are comprised in second conductive layer 318. First voltage source lead 206 extends through substrate 102 to connect first voltage source rail 204 with an electrode 104 of first subset of electrodes 122. Electroadhesive pad 470 further includes a first insulative layer 320 that extends over first conductive layer 316 and a second insulative layer 322 that extends over second conductive layer 318. As shown, second insulative layer 322 defines apertures 326 through which first voltage source rail 204 may be wired to a terminal of the power supply. Accordingly, the insulative layers form the exterior faces of electroadhesive pad 470 with first insulative layer 320 forming electroadhesive face 312 of electroadhesive pad 470 and second insulative layer 322 forming an opposed face 313 of electroadhesive pad 470.

As illustrative, non-exclusive examples, first insulative layer 320 and second insulative layer 322 each may have a thickness of at least approximately 60 microns, first conductive layer 316 and second conductive layer 318 each may have a thickness of at least approximately 17 microns, and substrate 102 may have a thickness of at least approximately 127 microns. As utilized herein, "at least approximately," when applied to a value refers to within ±20% of the stated value.

Figure 6:
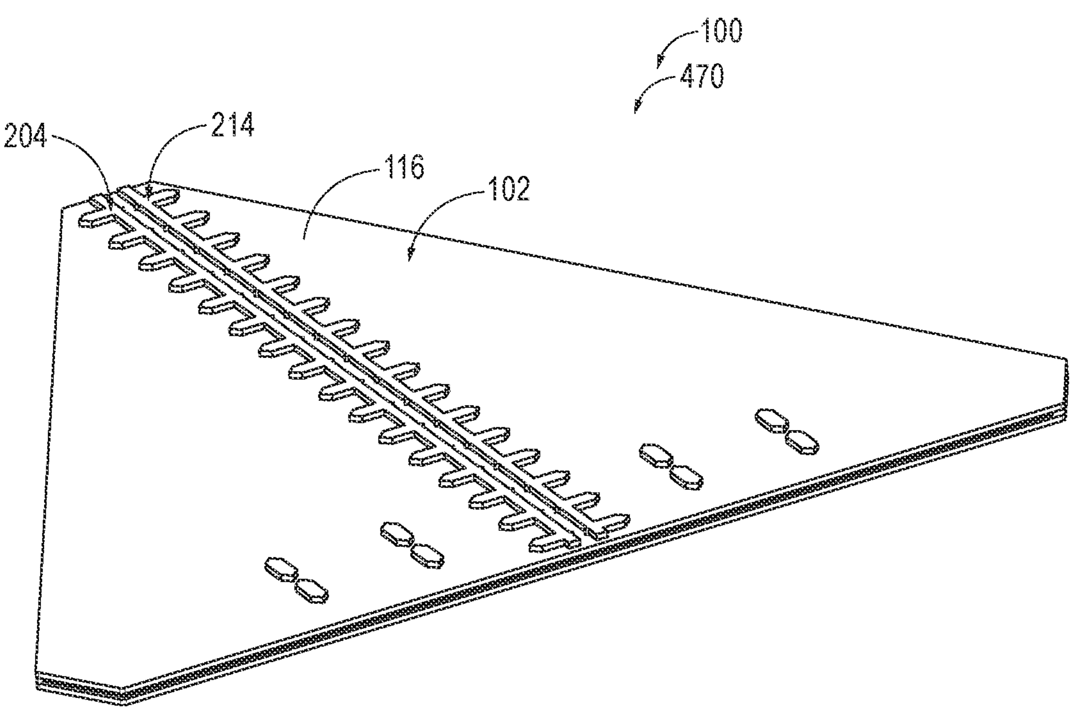
FIG. 6 is a rear elevation view of the example electroadhesive pad of FIG. 4.

FIG. 6 is a rear isometric view of electroadhesive pad 470 with second insulative layer 322 removed to show first voltage source rail 204 and second voltage source rail 214 supported on opposed side 116 of substrate 102.

Figure 7:
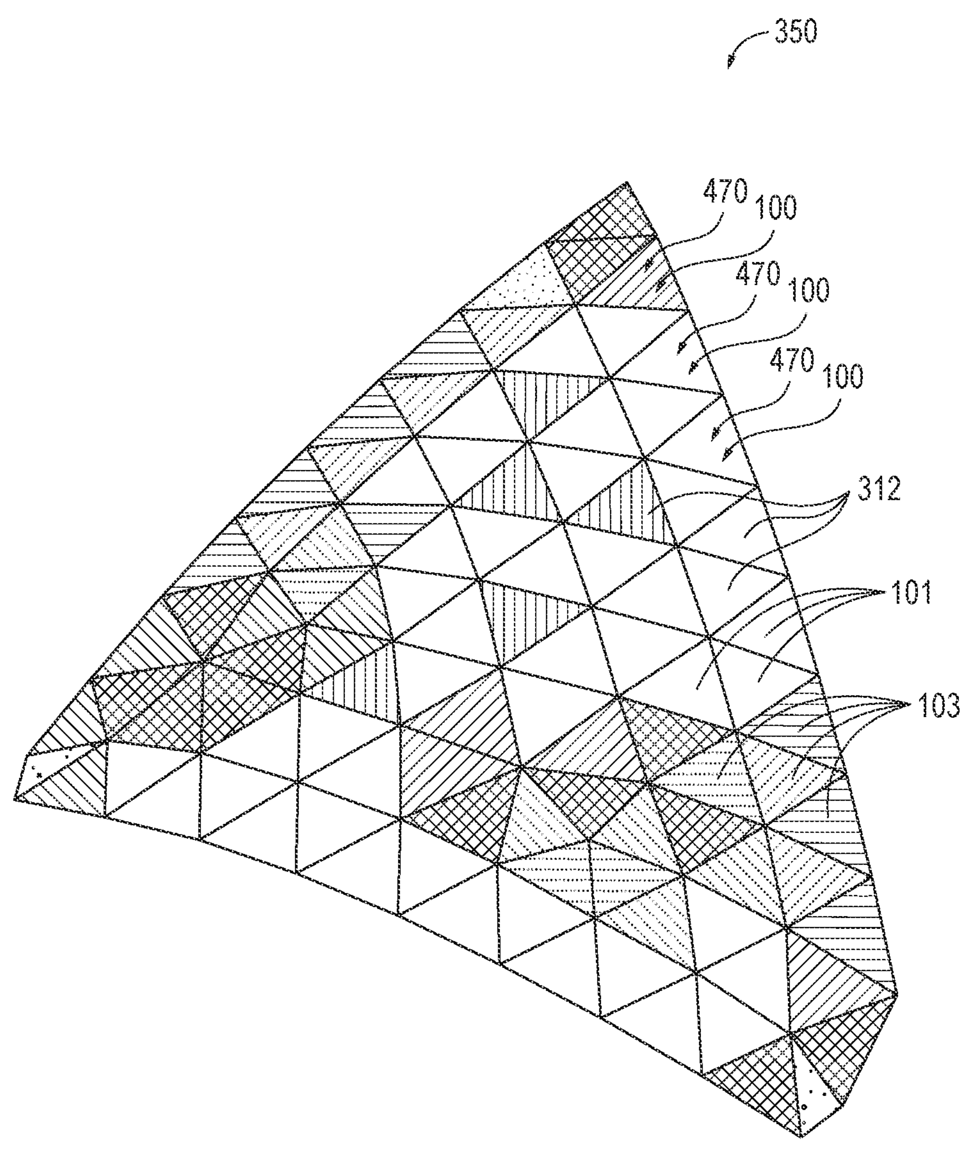
FIG. 7 is a bottom-up isometric view of an example electroadhesive end-effector according to the present disclosure.

FIG. 7 is a bottom up view of an electroadhesive end effector 350 that includes a plurality of electroadhesive pads 470 supported relative to one another in an edge-to-edge relationship. In this example, electroadhesive pads 470 are oriented and arranged such that electroadhesive faces 312 thereof collectively form an electroadhesive surface of electroadhesive end effector 350 that is contoured in three dimensions and that includes an overall shape that is generally triangular. Electroadhesive end effector 350 may be utilized as a pick-and-place end effector, and the three-dimensional contour of electroadhesive end effector 350 may be selected based upon an object or assembly that electroadhesive end effector 350 is configured to electroadhesively engage.

Each electroadhesive pad 470 is positioned with two or three sides of its perimeter 108 being held in close proximity to or abutting the sides of two or three other electroadhesive pads 470. Each electroadhesive pad 470 may be arranged in-plane or out-of-plane with the adjacent electroadhesive pads 470. Namely, adjacent electroadhesive pads 470 may be arranged in-plane with one another to form planar regions in electroadhesive end effector 350, and electroadhesive pads 470 may be arranged out of plane with one another to create three-dimensionally contoured or profiled regions in electroadhesive end effector 350.

Electroadhesive end effector 350 includes electroadhesive pads 470 in the form of stock electroadhesive pads 101 and electroadhesive pads 470 in the form of custom electroadhesive pads 103. Custom electroadhesive pads 103 are shaded for purpose of illustration and to show the contoured regions formed in the electroadhesive surface thereabout. Stock electroadhesive pads 101 each include the same shape and dimensions, whereas each custom electroadhesive pad 103 each may include a unique shape and/or unique dimensions. As shown in FIG. 7, utilizing custom electroadhesive pads 103 with unique shapes and/or dimensions permits electroadhesive pads 470 to be arranged to form a three-dimensional surface contour having geometries that are not accessible if each electroadhesive pad 470 were a stock electroadhesive pad 101. Accordingly, the shape and/or dimensions of each custom electroadhesive pad 103 may be selected based upon the desired surface contour of electroadhesive end effector 350 and the particular location of custom electroadhesive pad 103 within electroadhesive end effector 350.

Figure 8:
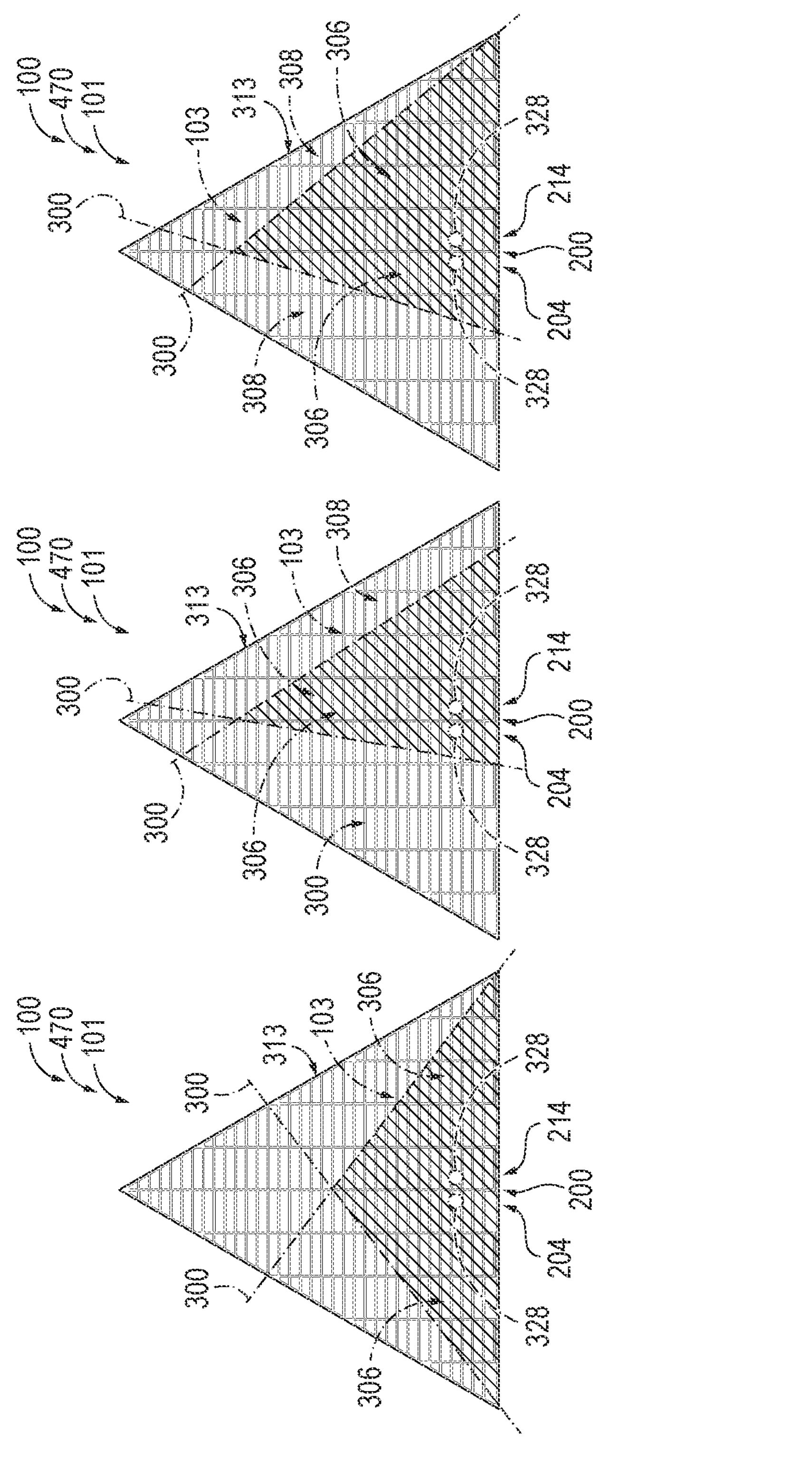
FIG. 8 is elevation view illustrating examples of stock electroadhesive pads with example cutlines mapped thereon.

FIG. 8 is a front elevation view of three electroadhesive pads 470 in the form of stock electroadhesive pads 101. The first insulative layer of each electroadhesive pad 470 is removed to show the grid of electrodes 104, as discussed herein. Each electroadhesive pad 470 includes power supply connections 328 that are configured to connect first voltage source rail 204 and second voltage source rail 214 to the power supply. Power supply connections 328 are schematically illustrated in dot-dashed lines to show the location along opposed face 313 of electroadhesive pad 470 at which power supply connections 328 are connected to first voltage source rail 204 and second voltage source rail 214.

A unique pair of schematic cutlines 300 are mapped onto each electroadhesive pad 470, demonstrating an example cut for converting stock electroadhesive pad 101 into a custom electroadhesive pad 103. Cutlines 300 at least partially define the shape and dimensions of custom electroadhesive pad 103, which may be selected, for example, based on the specific location of custom electroadhesive pad 103 within an electroadhesive end effector 350, such as the example electroadhesive end effector 350 of FIG. 7. As discussed, cutlines 300 segregate stock electroadhesive pad 101 into retained regions 306, which are defined inside of each pair of cutlines 300, and severed regions 308 which are defined outside of each pair of cutlines 300. Retained regions 306 are shaded in FIG. 8 demonstrating the area of electrodes 104 therein that will remain electrically connected to voltage source assembly 200 after stock electroadhesive pad 101 is cut along cutlines 300, thereby severing severed regions 308 from retained regions 306 and converting stock electroadhesive pad 101 into custom electroadhesive pad 103.

Figure 9:
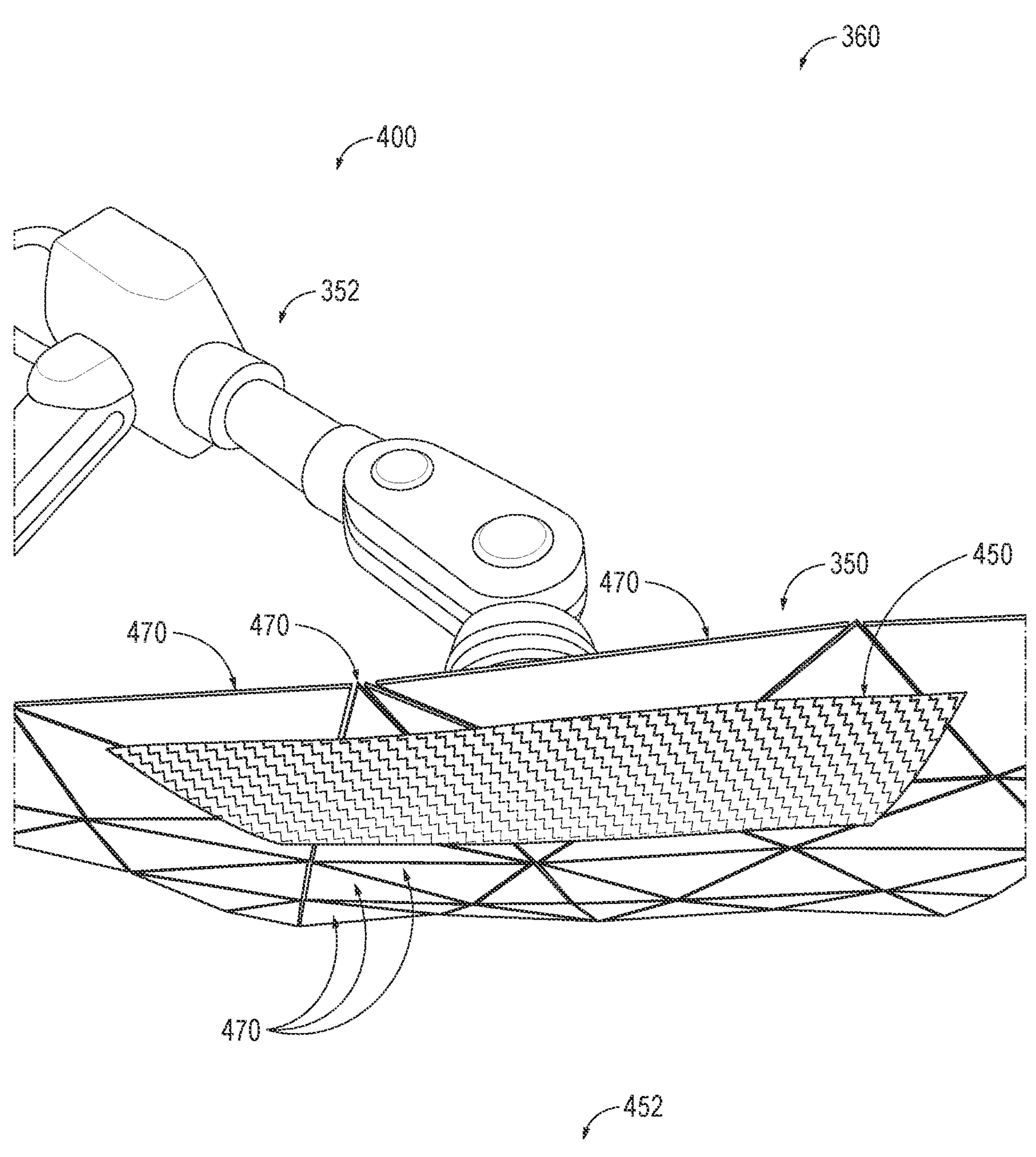
FIG. 9 is an isometric view illustrating an example pick and place robotic assembly according to the present disclosure.

FIG. 9 is a partial isometric view illustrating an example of a pick-and-place robotic assembly 360 that comprises a robotic arm 352 and an electroadhesive end effector 350 operatively attached to robotic arm 352. Electroadhesive end effector 350 comprises a plurality of electroadhesive pads 470 that are arranged in an edge-to-edge relationship to create an electroadhesive surface having overall shape that is rectangular. Electroadhesive pads 470 are oriented relative to one another within the arrangement to form a preselected three-dimensional surface contour. In this example, one or more power supplies 400 are providing electrical power to each electroadhesive pad 470. A series of electroadhesive pads 470 within electroadhesive end effector 350 are electroadhesively engaged with an object 450 such that object 450 is suspended above a support surface 452. In this example, object 450 includes a sheet of pliable material (e.g., a fabric, a metal foil, or a pre-preg composite material) that conforms to the surface contour of electroadhesive end effector 350 as a result of electroadhesive engagement by the series of electroadhesive pads 470.

Robotic arm 352 is configured to orient and translate electroadhesive end effector 350, for example with six degrees of freedom, such that robotic assembly 360 may position and orient object 450 while it is electroadhesively engaged with electroadhesive end effector 350. Robotic assembly 360 also may be configured to control operation of electroadhesive end effector 350 by controlling power supply 400. For example, robotic assembly 360 may be configured to cause power supply 400 to supply electrical power to electroadhesive pads 470 to pick up, hold, and carry object 450, and robotic assembly 360 may be configured to direct power supply 400 to reduce or cease the supply of electrical power to electroadhesive pads 470 to selectively release object 450.

Figure 10:
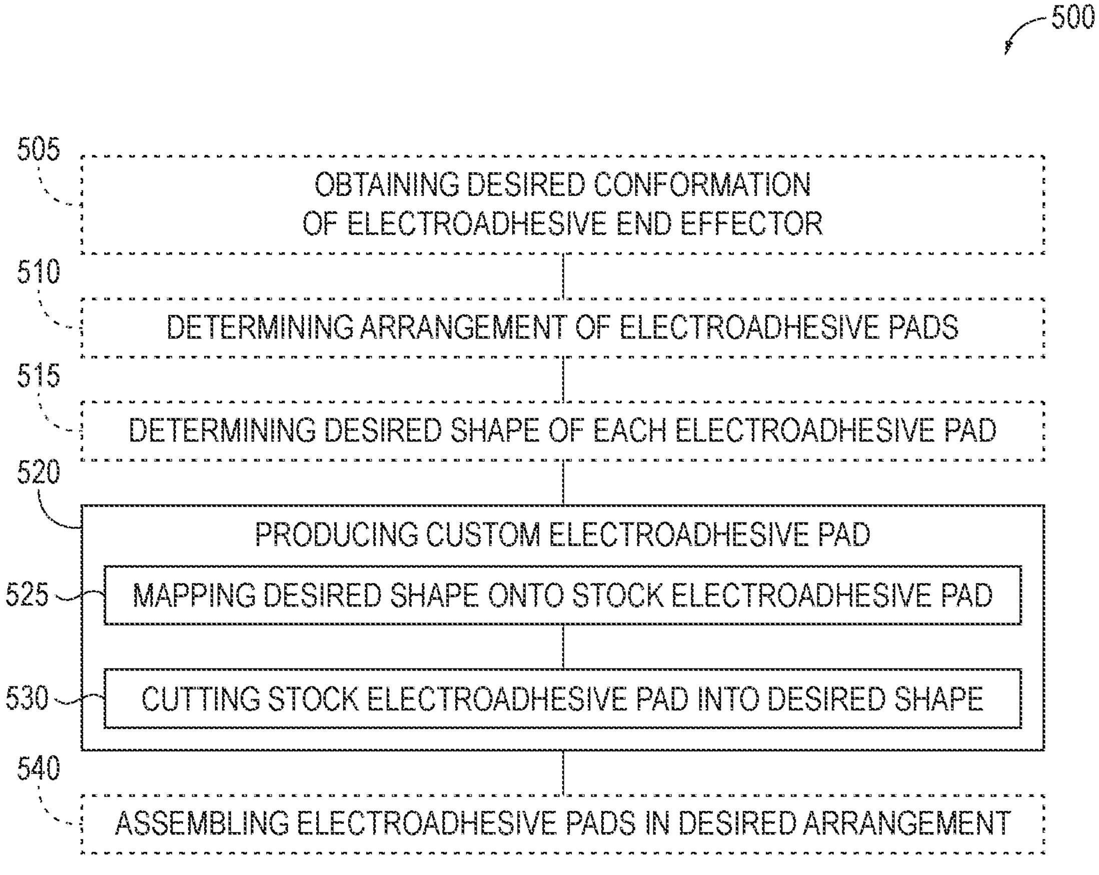
FIG. 10 is a flowchart schematically representing examples of methods according to the present disclosure.

FIG. 10 schematically provides a flowchart that represents illustrative, non-exclusive examples of methods 500 according to the present disclosure. In FIG. 10, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 10 are not limiting and other methods and steps are within the scope of the present disclosure, including methods having greater than or fewer than the number of steps illustrated, as understood from the discussions herein.

Methods 500 include methods of producing a custom electroadhesive pad, and methods 500 may include methods of producing an electroadhesive end effector. Each step or portion of methods 500 may be performed to produce any of electroadhesive pads 100 and/or any of electroadhesive end effectors 350 that are illustrated and discussed herein with reference to FIGS. 1-9. Likewise, any of the features, functions, structures, portions, etc. of electroadhesive pads 100 and electroadhesive end effectors 350 that are discussed herein with reference to methods 500 and FIG. 10 may be included in and/or utilized with the examples of FIGS. 1-9 without departing from the present disclosure.

As shown in FIG. 10, methods 500 include producing 520 a custom electroadhesive pad. The producing 520 comprises mapping 525 a desired shape of the custom electroadhesive pad onto a stock electroadhesive pad and cutting 530 the stock electroadhesive pad into the desired shape to produce the custom electroadhesive pad. In some examples, methods 500 include methods of producing an electroadhesive end effector. In such examples, methods 500 may further include obtaining 505 a desired conformation of the electroadhesive end effector, determining 515 an arrangement of a plurality of electroadhesive pads that collectively create the desired conformation, and optionally assembling 540 the plurality of electroadhesive pads 100 in the arrangement.

The producing 520 comprises producing a custom electroadhesive pad 103 from and/or utilizing a stock electroadhesive pad 101. As discussed, the stock electroadhesive pad 101 and the custom electroadhesive pad 103 are electroadhesive pads 100. Accordingly, the stock electroadhesive pad 101 utilized in the producing 520 and the custom electroadhesive pad 103 produced by the producing 520 each may include any of the features, functions, components, etc. of electroadhesive pads 100 that are discussed herein in connection to FIGS. 1-9.

As mentioned, the producing comprises mapping 525 a desired shape of the custom electroadhesive pad onto a stock electroadhesive pad and cutting 530 the stock electroadhesive pad into the desired shape to produce the custom electroadhesive pad. Accordingly, the mapping 525 may be performed prior to the cutting 530 and the shape and dimensions of the stock electroadhesive pad 101 are different from the shape and dimensions of the custom electroadhesive pad 103.

In some examples, the mapping 525 comprises mapping one or more cutlines 300 onto the stock electroadhesive pad 101. In some such examples, the mapping 525 comprises selecting the location and orientation of each cutline 300 based on the desired shape of the custom electroadhesive pad such that the one or more cutlines 300 at least partially define the desired shape of the custom electroadhesive pad 103 on the stock electroadhesive pad 101. As examples, the mapping 525 may comprise mapping at least one, at least two, at least three, at most two, at most three, at most four, at most five, and/or at most ten cutlines 300 onto the stock electroadhesive pad. Each cutline 300 may have any suitable conformation. For example, each cutline 300 may be linear for examples in which the desired shape of the custom electroadhesive pad 103 is polygonal. Additionally or alternatively, the mapping 525 may comprise mapping one or more curved cutlines 300 for examples in which the desired shape of the custom electroadhesive pad 103 comprises curves.

More specifically, as discussed, the stock electroadhesive pad 101 includes a substrate 102, a plurality of electrodes 104 that are supported on the substrate 102, such as on an electrode side 114 of the substrate 102, and that extend between a central region 106 of the stock electroadhesive pad 101 and a stock perimeter 108 of the stock electroadhesive pad 101. The stock electroadhesive pad 101 further comprises a voltage source assembly 200 provided along central region 106, and the stock electroadhesive pad 101 defines middle regions 110 between the central region 106 and the stock perimeter 108. In some examples, the mapping 525 comprises mapping the one or more cutlines 300 onto the middle regions 110 of the stock electroadhesive pad 101.

Each cutline 300 defines a portion a custom perimeter 108 of the custom electroadhesive pad 103. Accordingly, at least a portion of each cutline 300 may extend between the stock perimeter 108 of the stock electroadhesive pad 101 and the central region 106 of the stock electroadhesive pad 101. In other words, each cutline 300 may extend through at least one middle region 110 of stock electroadhesive pad 101. Each cutline 300 also may extend through the stock perimeter 108 of stock electroadhesive pad 101. In some examples, the cutline 300 extends through the central region 106 of stock electroadhesive pad 101 and at least partially through the middle regions 110 on either side of central region 106. For examples in which the mapping 525 comprises mapping a plurality of cutlines 300 onto the stock electroadhesive pad, the cutlines 300 may be intersecting (e.g., as shown in the examples of FIG. 8) or non-intersecting (e.g., as shown in the examples of FIG. 2).

In some examples, the mapping 525 comprises defining one or more retained regions 306 and one or more severed regions 308 on the stock electroadhesive pad 101. As discussed, the one or more retained regions 306 are defined inside of the one or more cutlines 300 and the one or more severed regions 308 are defined outside of the one or more cutlines 300, or between the one or more cutlines 300 and the stock perimeter 108. In such examples, the one or more retained regions 306 are contiguous with one another and comprise at least a portion of the central region 106.

As discussed, in some examples, the plurality of electrodes 104 of the stock electroadhesive pad 101 are arranged in a plurality of branches, where each branch extends from the central region 106 towards or to the stock perimeter 108 of the stock electroadhesive pad 101. In some examples, the mapping 525 comprises mapping one or more cutlines onto the stock electroadhesive pad 101 that extend through one or more of the branches such that each of the one or more branches comprises a first portion within the one or more retained regions 306 and a second portion within the one or more severed regions 308.

With continued reference to FIG. 10, the producing 520 further comprises cutting 530 the stock electroadhesive pad into the desired shape to produce the custom electroadhesive pad. The cutting 530 may be performed subsequent to the mapping 525. The cutting 530 comprises removing at least a portion of the stock electroadhesive pad 101 to produce the custom electroadhesive pad 103. Accordingly, the cutting 530 may include cutting through an entire pad thickness 314 of the stock electroadhesive pad 101. In other words, the cutting 530 may include cutting through each layer of the stock electroadhesive pad 101, such as the substrate 102, the first conductive layer 316, and the second conductive layer 318 thereof. The cutting 530 also includes removing at least a portion of the stock perimeter 108 of the stock electroadhesive pad 101. The cutting 530 may be performed in via any suitable mechanism such as shearing, sawing, snipping, milling, laser cutting, plasma cutting, water jet cutting, etc.

For examples in which the mapping 525 comprises mapping one or more cutlines 300 onto the stock electroadhesive pad 101, the cutting 530 comprises cutting the stock electroadhesive pad 101 along the one or more cutlines 300. In other words, in such examples, the cutting 530 comprises sectioning the stock electroadhesive pad 101 along the one or more cutlines 300. As discussed, in some examples, the mapping the one or more cutlines 300 comprises defining one or more retained regions 306 and one or more severed regions 308 on the stock electroadhesive pad 101. In such examples, the cutting 530 the stock electroadhesive pad 101 along the one or more cutlines 300 comprises separating the one or more severed regions 308 from the one or more retained regions 306 such that the retained regions 306 are comprised in the custom electroadhesive pad 103 and the one or more severed regions 308 are not comprised in the custom electroadhesive pad 103.

As discussed, at least a portion of the central region 106 of the stock electroadhesive pad 101 is comprised in the one or more retained regions 306. As such, at least a portion of, and optionally at least a substantial portion of, the electrodes 104 within the one or more retained regions 306 are in electrical connection with the voltage source assembly 200 subsequent to the cutting 530. In some examples, the cutting 530 comprises cutting through one or more branches of electrodes 104 to separate the first portion of the one or more branches that is within the one or more retained regions from the second portion of the one or more branches that is within the one or more severed regions 308. In some such examples, the first portion of each of the one or more branches is electrically connected to the voltage source assembly 200 subsequent to the cutting 530.

In some examples, methods 500 comprise producing an electroadhesive end effector 350. In such examples, methods 500 comprise obtaining 505 a desired conformation of the electroadhesive end effector, determining 510 an arrangement of electroadhesive pads that collectively create the desired conformation, determining 515 a desired shape of each electroadhesive pad, and the producing 520. In such examples, the obtaining 505, the determining 510, and the determining 515, may be performed prior to the producing 520.

The obtaining 505 may include obtaining a desired overall shape of the electroadhesive end effector and obtaining a desired three-dimensional surface contour of the electroadhesive end effector 350. The obtaining 505 may include obtaining the desired conformation of the electroadhesive end effector in any suitable manner. As discussed, the desired surface contour of the electroadhesive end effector 350 may be based on the shape, profile, and/or surface contour of an object that the electroadhesive end effector 350 is configured to engage. The obtaining 505 may include receiving a representation of the desired conformation from a third party. Alternatively, the obtaining 505 may include creating the representation of the desired conformation based on any suitable criteria, such as the shape, profile, and/or surface contour of an object that the electroadhesive end effector 350 is configured to engage.

The determining 510 may be performed subsequent to the obtaining 505. The determining 510 the arrangement of electroadhesive pads that collectively creates the desired conformation of the electroadhesive end effector may include determining an arrangement of electroadhesive pads that collectively creates the desired three-dimensional surface contour and/or the desired overall shape of the electroadhesive end effector. For example, the determining 510 may include determining an arrangement of electroadhesive pads that, when assembled in an edge-to-edge relationship, creates the desired three-dimensional surface contour and the desired overall shape. In some examples, the determining 510 comprises determining a relative orientation of each electroadhesive pad 100 within the arrangement based on the location of each electroadhesive pad 100 within the arrangement and relative to the desired surface contour. In other words, the determining 510 may comprise determining a relative orientation of each electroadhesive pad 100 within the arrangement such that the electroadhesive face 312 of each electroadhesive pad 100 at least substantially follows, or is at least substantially aligned with, the desired surface contour. The determining 510 also may include determining a number of electroadhesive pads required to produce the arrangement, such as based on the surface area of each pad, the surface area of the desired surface contour, and the curvature of the desired surface contour.

The determining 515 may be performed subsequent to or at least substantially simultaneously with the determining 510. The determining 515 may include determining the desired shape and/or desired dimensions of each electroadhesive pad within the arrangement based on criteria such as the location of each electroadhesive pad 100 within the arrangement and/or the curvature of the desired surface contour along and/or surrounding the location of each electroadhesive pad 100 within the arrangement.

The determining 515 comprises determining that the desired shape of at least one electroadhesive pad 100 within the arrangement is different from a stock shape of a stock electroadhesive pad 101. The desired shape of the at least one electroadhesive pad 100 may be unique or different from the desired shape of any other electroadhesive pad 100 within the arrangement. In other words, the determining 515 comprises determining that the arrangement of electroadhesive pads 100 requires at least one custom electroadhesive pad 103 to create the desired three-dimensional surface contour. In some examples, the determining 515 comprises determining that the arrangement of electroadhesive pads 100 requires a plurality of custom electroadhesive pads 103 to create the desired three-dimensional surface contour. In some examples, the desired shape of each custom electroadhesive pad 103 is unique. In some examples, the determining 515 comprises determining the desired shape of one or more other electroadhesive pads within the arrangement to be the stock shape of the stock electroadhesive pad 101.

For examples in which methods 500 comprise producing an electroadhesive end effector 350, methods 500 comprise performing the producing 520 respective to each custom electroadhesive pad 103 that is determined at 515 to be needed in the arrangement. For examples in which the determining 515 comprises determining that the arrangement of electroadhesive pads 100 requires a plurality of custom electroadhesive pads 103 to create the desired three-dimensional surface contour, the producing 520 comprises producing each custom electroadhesive pad 103 with the desired shape determined at 515, which may be unique. In other words, methods 500 may include repeating the producing 520 respective to each custom electroadhesive pad 103, in which the desired shape of each custom electroadhesive pad 103 produced at 520 may be the same as or different from the desired shape of any other custom electroadhesive pad 103 produced at 520.

For some examples in which methods 500 comprise producing an electroadhesive end effector 350, methods 500 further comprise assembling 540 the plurality of electroadhesive pads in the arrangement and operably securing the plurality of electroadhesive pads 100 in the desired arrangement. The assembling 540 comprises positioning the plurality of electroadhesive pads 100 in their respective locations within the arrangement. The assembling 540 may include orienting each electroadhesive pad to the respective orientation determined at 510. The assembling 540 also may include positioning the plurality of electroadhesive pads 100 edge-to-edge with one another such that the electroadhesive faces 312 of the plurality of electroadhesive pads 100 collectively form and/or at least substantially follow the desired surface contour.

Illustrative, non-exclusive examples of inventive subject matter according to the present disclosure are described in the following enumerated paragraphs:

A. An electroadhesive pad (100), comprising:

a substrate (102);

a first electrical network (120), comprising:

a first subset of electrodes (122) supported by the substrate (102) and extending between a central region (106) of the electroadhesive pad (100) and a perimeter (108) of the electroadhesive pad (100);

a first voltage source (202) electrically connected to the first subset of electrodes (122), wherein the first voltage source (202) is disposed along the central region (106) of the electroadhesive pad (100), wherein the first voltage source (202) is configured to apply an output voltage at a first polarity to the first subset of electrodes (122);

a second electrical network (140), comprising:

a second subset of electrodes (142) supported by the substrate (102) and extending between the central region (106) of the electroadhesive pad (100) and the perimeter (108) of the electroadhesive pad (100); and a second voltage source (210) electrically connected to the second subset of electrodes (142), wherein the second voltage source (210) is disposed along the central region (106) of the electroadhesive pad (100), wherein the second voltage source (210) is configured to apply the output voltage at a second polarity to the second subset of electrodes (142), and wherein the second polarity is opposite to the first polarity.

A1. The electroadhesive pad (100) of paragraph A, wherein the first electrical network (120) is configured to convey electrical current through the first subset of electrodes (122) in an outward direction (112) from the central region (106) of the electroadhesive pad (100) towards the perimeter (108) of the electroadhesive pad (100), and wherein the second electrical network (140) is configured to convey electrical current through the second subset of electrodes (142) in the outward direction (112) from the central region (106) of the electroadhesive pad towards the perimeter (108) of the electroadhesive pad (100).

A2. The electroadhesive pad (100) of any of paragraphs A-A1, wherein electrodes (104) of the first subset of electrodes (122) are arranged in an alternating relationship with electrodes (104) of the second subset of electrodes (142) between the central region (106) of the electroadhesive pad (100) and the perimeter (108) of the electroadhesive pad (100).

A3. The electroadhesive pad of any of paragraphs A-A2, wherein adjacent electrodes (104) of the first subset of electrodes (122) are positioned diagonally relative to one another, and wherein adjacent electrodes (104) of the second subset of electrodes (142) are positioned diagonally relative to one another.

A4. The electroadhesive pad (100) of any of paragraphs A-A3, wherein the first subset of electrodes (122) and the second subset of electrodes (142) collectively define a plurality of electrodes (104), and wherein the plurality of electrodes (104) are arranged in a grid of rows (302) and columns (304), wherein the first subset of electrodes (122) and the second subset of electrodes (142) are arranged alternating relationship in each row (302) and in each column (304).

A5. The electroadhesive pad (100) of any of any of paragraphs A-A4, wherein the first electrical network (120) is electrically insulated from the second electrical network (140).

A6. The electroadhesive pad (100) of any of paragraphs A-A5, wherein the substrate (102) comprises an electrode side (114) and an opposed side (116) that is opposed to the electrode side (114), wherein the first subset of electrodes (122) and the second subset of electrodes (142) are supported on the electrode side (114) of the substrate (102).

A7. The electroadhesive pad (100) of paragraphs A-A6, wherein the first voltage source (202) comprises a plurality of first voltage source leads (206) positioned along the central region (106) of the electroadhesive pad (100), and wherein each first voltage source lead (206) of the plurality of first voltage source leads (206) is directly connected with a respective electrode (104) of the first subset of electrodes (122).

A8. The electroadhesive pad (100) of paragraph A7, wherein the first voltage source (202) further comprises a first voltage source rail (204) that extends along the central region (106) of the electroadhesive pad (100) and that electrically connects the plurality of first voltage source leads (206) to one another, and wherein the first voltage source rail (204) is spaced apart from a/the plurality of electrodes (104) by the substrate (102).

A8.1 The electroadhesive pad (100) of paragraph A8, when depending from paragraph A6, wherein the first voltage source rail (204) extends along the opposed side (116) of the substrate (102), and wherein each first voltage source lead (206) of the plurality of voltage source leads extends through the substrate (102) from the opposed side (116) of the substrate (102) to the electrode side (114) of the substrate (102).

A9. The electroadhesive pad (100) of any of paragraphs A-A8.1, wherein the second voltage source (210) comprises a plurality of second voltage source leads (212) positioned along the central region (106) of the electroadhesive pad (100), and wherein each second voltage source lead (212) of the plurality of second voltage source leads (212) is directly connected with a respective electrode (104) of the second subset of electrodes (142).

A10. The electroadhesive pad (100) of paragraph A9, wherein the second voltage source (210) comprises a second voltage source rail (214) that extends along the central region (106) of the electroadhesive pad (100) and that electrically connects the plurality of second voltage source leads (212) to one another, and wherein the second voltage source rail (214) is spaced apart from a/the plurality of electrodes (104) by the substrate (102).

A10.1 The electroadhesive pad (100) of paragraph A10, when depending from paragraph A6, wherein the second voltage source rail (214) extends along the opposed side (116) of the substrate (102), and wherein each second voltage source lead (212) of the plurality of second voltage source leads (212) extends through the substrate (102) from the opposed side (116) of the substrate (102) to the electrode side (114) of the substrate (102).

A11. The electroadhesive pad (100) of any of paragraphs A-A10.1, wherein a/the plurality of electrodes (104) are arranged in a plurality of branches comprising a plurality of first subset branches (124) and a plurality of second subset branches (144), wherein each branch of the plurality of branches comprises one or more electrodes (104) and extends between the central region (106) of the electroadhesive pad (100) to the perimeter (108) of the electroadhesive pad (100).

A12. The electroadhesive pad (100) of paragraph A11, when depending from paragraph A7, wherein each first subset branch (124) of the plurality of first subset branches (124) comprises two or more electrodes (104) of the first subset of electrodes (122) connected in series with one another, and wherein each first subset branch (124) is directly connected to a respective first voltage source lead (206) of the plurality of first voltage source leads (206).

A13. The electroadhesive pad (100) of any of paragraphs A11-A12, when depending from paragraph A9, wherein each second subset branch (144) of the plurality of second subset branches (144) comprises two or more electrodes (104) of the second subset of electrodes (142) connected in series with one another, and wherein each second subset branch (144) is directly connected to a respective second voltage source lead (212) of the plurality of second voltage source leads (212).

A14. The electroadhesive pad (100) of any of paragraphs A11-A13, wherein the perimeter (108) of the electroadhesive pad (100) comprises a pair of perimeter sections (118) that are positioned on opposing sides of the central region (106) of the electroadhesive pad (100), and wherein each branch of the plurality of branches extends in an/the outward direction (112) from the opposing sides of the central region (106) towards both of the perimeter sections (118).

A15. The electroadhesive pad (100) of any of paragraphs A11-A14, wherein the plurality of first subset branches (124) and the plurality of second subset branches (144) are arranged in an alternating pattern along a length (310) of the electroadhesive pad (100).

A16. The electroadhesive pad (100) of any of paragraphs A11-A15, further comprising a plurality of first subset perimeter connections (134) and a plurality of second subset perimeter connections (134), wherein each first subset perimeter connection (134) electrically interconnects outside ends of adjacent first subset branches (124) to one another, and wherein each second subset perimeter connection (134) electrically interconnects outside ends of adjacent second subset branches (144) to one another.

A17. The electroadhesive pad (100) of any of paragraphs A-A16, wherein the substrate (102) is one or more of electrically insulating or formed of an electrically insulating material.

A18. The electroadhesive pad (100) of any of paragraphs A-A17, wherein at least a threshold fraction of a frontal area of the electroadhesive pad (100) is defined between each side of the central region (106) and a respective perimeter section (118) of the perimeter (108), and wherein the threshold fraction is at least 10%, at least 20%, at least 30%, at least 40%, at least 50%, at least 60%, at least 70%, at least 80%, most 50% at most 60%, at most 70%, at most 80%, and/or at most 90%.

A19. The electroadhesive pad (100) of paragraph A18, wherein a/the first voltage source rail (204) of the first voltage source (202) defines a first side (130) of the central region (106), and wherein a/the second voltage source rail (214) of the second voltage source (210) defines a second side (132) of the central region (106) that opposes the first side (130) of the central region (106).

A20. The electroadhesive pad (100) of any of paragraphs A-A19, wherein the central region (106) at least substantially bisects a/the frontal areal of the electroadhesive pad (100).

A21. The electroadhesive pad of any of paragraphs A-A20, wherein the substrate (102) is at least substantially planar.

A22. The electroadhesive pad (100) of any of paragraphs A-A21, wherein the electroadhesive pad (100) defines a middle region (110) between each side of the central region (106) and the perimeter (108), wherein the electroadhesive pad (100) is configured to be severed along a cutline (300) that extends through the middle region (110) and maintain electrical connection between the first voltage source (202) and at least a substantial portion of all electrodes (104) of the first subset of electrodes (122) that are positioned at least partially inside of the cutline (300) and maintain electrical connection between the second voltage source (210) and at least a substantial portion of all electrodes (104) of the second subset of electrodes (142) that are positioned at least partially inside of the cutline (300).

B. An electroadhesive end effector (350), comprising:

a plurality of the electroadhesive pads (100) of any of paragraphs A-A22, operatively supported relative to one another in an arrangement in which electroadhesive faces (312) of the plurality of electroadhesive pads (100) collectively define a desired three-dimensional surface contour.

B1. The electroadhesive end effector (350) of paragraph B, wherein the plurality of electroadhesive pads (100) are arranged in an edge-to-edge relationship.

B2. The electroadhesive end effector (350) of any of paragraphs B-B1, wherein one or more electroadhesive pads (100) of the plurality of electroadhesive pads (100) comprises a unique shape and is a custom electroadhesive end effector.

B3. The electroadhesive end effector (350) of paragraph B2, wherein the one or more electroadhesive pads (100) are one or more custom electroadhesive pads (103), and wherein at least a portion of the electroadhesive end effector (350) is produced according to the methods (500) of any of paragraphs C-C9.

C. A method (500) of producing (520) a custom electroadhesive pad (103), the method (500) comprising:

mapping (525) a desired shape of the custom electroadhesive pad (103) onto a stock electroadhesive pad (101); and cutting (530) the stock electroadhesive pad (101) into the desired shape to produce the custom electroadhesive pad (103).

C1. The method (500) of paragraph C, wherein the stock electroadhesive pad (101) comprises a substrate (102), a plurality of electrodes (104) supported on the substrate (102) and extending between a central region (106) of the stock electroadhesive pad (101) and a stock perimeter (108) of the stock electroadhesive pad (101), and a voltage source assembly (200) provided along the central region (106) of the stock electroadhesive pad (101), wherein the stock electroadhesive pad (101) defines a middle region (110) between the central region (106) and the stock perimeter (108), and wherein the cutting (530) comprises cutting through the middle region (110) to define a custom perimeter (108) of the custom electroadhesive pad (103) in the desired shape.

C2. The method (500) of paragraph C1, wherein the cutting (530) comprises removing at least a portion of the stock perimeter (108) from the stock electroadhesive pad (101).

C3. The method (500) of any of paragraphs C-C2, wherein the mapping (525) comprises mapping one or more cutlines (300) onto the stock electroadhesive pad (101), and optionally onto a/the middle region (110) of the stock electroadhesive pad (101), and wherein the cutting (530) comprises cutting the stock electroadhesive pad (101) along the one or more cutlines (300).

C4. The method (500) of paragraph C3, wherein the mapping (525) comprises defining one or more retained regions (306) on the stock electroadhesive pad (101) that are defined inside of the one or more cutlines (300) and defining one or more severed regions (308) on the stock electroadhesive pad (101) that are defined outside of the one or more cutlines (300).

C5. The method (500) of paragraph C4, wherein the cutting (530) comprises severing the one or more severed regions (308) from the one or more retained regions (306).

C6. The method (500) of any of paragraphs C4-05, wherein at least a substantial portion of and optionally all electrodes (104) within the one or more retained regions (306) are in electrical connection with the voltage source assembly (200) subsequent to the cutting (530).

C7. The method (500) of any of paragraphs C-C6, wherein the plurality of electrodes (104) are arranged in a plurality of branches, wherein each branch extends from a/the central region (106) of the stock electroadhesive pad (101) towards or to a/the stock perimeter (108) of the stock electroadhesive pad (101), wherein one or more branches of the plurality of branches comprises a first portion within the one or more retained regions (306) and a second portion within the severed regions (308), and wherein the first portion of each of the one or more branches is electrically connected to a/the voltage source assembly (200) of the stock electroadhesive pad (101) subsequent to the cutting (530).

C8. The method (500) of any of paragraphs C-C7, wherein the cutting (530) comprises cutting though the substrate (102).

C9. The method (500) of any of paragraphs C-C8, wherein the custom electroadhesive pad (103) and/or the stock electroadhesive pad (101) is the electroadhesive pad (100) of any of paragraphs A-A22.

D. A method (500) of producing an electroadhesive end effector (350), the method (500) comprising:

obtaining (505) a desired three-dimensional surface contour of the electroadhesive end effector (350);

determining (510) an arrangement of a plurality of electroadhesive pads (100) that collectively create the desired three-dimensional surface contour;

determining (515) that a desired shape of one or more electroadhesive pads (100) of the plurality of electroadhesive pads (100) is different from a stock shape of a stock electroadhesive pad (101), wherein the one or more electroadhesive pads are one or more custom electroadhesive pads (103); and performing the method (500) of any of paragraphs C-C9, respective to each custom electroadhesive pad (103) of the one or more custom electroadhesive pads (103) to produce each of the one or more custom electroadhesive pads (103) with the desired shape.

D1. The method (500) of paragraph D, wherein the desired shape of each electroadhesive pad (100) of the one or more custom electroadhesive pads (103) is unique.

D2. The method (500) of any of paragraphs D-D2, wherein the desired shape of each custom electroadhesive pad (103) is selected based upon a location of the custom electroadhesive pad (103) within the arrangement of electroadhesive pads (100).

D3. The method (500) of any of paragraphs D-D2, further comprising assembling (540) the plurality of electroadhesive pads (100) in the arrangement and operably securing the plurality of electroadhesive pads (100) relative to one another in the arrangement.

D4. The method (500) of paragraph D3, wherein the assembling (540) comprises positioning the plurality of electroadhesive pads edge-to-edge with one another.

D5. The method (500) of any of paragraphs D-D4, wherein the electroadhesive end effector (350) is the electroadhesive end effector (350) of any of paragraphs B-B2.

E. The use of the electroadhesive pad (100) of any of paragraphs A-A22 to electroadhesively engage an object.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or"

clause, whether related or unrelated to those entities specifically identified. Thus, as a non-limiting example, a reference to “A and/or B,” when used in conjunction with open-ended language such as “comprising,” may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase, “for example,” the phrase, “as an example,” the phrase “in some examples,” and/or simply the term “example,” when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, “at least substantially,” when modifying a degree or relationship, includes not only the recited “substantial” degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An electroadhesive pad, comprising:

a substrate;

a first electrical network, comprising:

a first subset of electrodes supported by the substrate and extending between a central region of the electroadhesive pad and a perimeter of the electroadhesive pad;

a first voltage source electrically connected to the first subset of electrodes, wherein the first voltage source is disposed along the central region of the electroadhesive pad, wherein the first voltage source is configured to apply an output voltage at a first polarity to the first subset of electrodes;

a second electrical network, comprising:

a second subset of electrodes supported by the substrate and extending between the central region of the electroadhesive pad and the perimeter of the electroadhesive pad; and a second voltage source electrically connected to the second subset of electrodes, wherein the second voltage source is disposed along the central region of the electroadhesive pad, wherein the second voltage source is configured to apply the output voltage at a second polarity to the second subset of electrodes, and wherein the second polarity is opposite to the first polarity.

2. The electroadhesive pad of claim 1, wherein the first electrical network is configured to convey electrical current through the first subset of electrodes in an outward direction from the central region of the electroadhesive pad towards the perimeter of the electroadhesive pad, and wherein the second electrical network is configured to convey electrical current through the second subset of electrodes in the outward direction from the central region of the electroadhesive pad towards the perimeter of the electroadhesive pad.

3. The electroadhesive pad of claim 1, wherein the first voltage source comprises a plurality of first voltage source leads positioned along the central region of the electroadhesive pad, and wherein each first voltage source lead of the plurality of first voltage source leads is directly connected with a respective electrode of the first subset of electrodes.

4. The electroadhesive pad of claim 3, wherein the first voltage source further comprises a first voltage source rail that extends along the central region of the electroadhesive pad and that electrically connects the plurality of first voltage source leads to one another, and wherein the first voltage source rail is spaced apart from the first subset of electrodes and the second subset of electrodes by the substrate.

5. The electroadhesive pad of claim 4, wherein the second voltage source comprises a plurality of second voltage source leads positioned along the central region of the electroadhesive pad, and wherein each second voltage source lead of the plurality of second voltage source leads is directly connected with respective electrode of the second subset of electrodes.

6. The electroadhesive pad of claim 5, wherein the second voltage source comprises a second voltage source rail that extends along the central region of the electroadhesive pad and that electrically connects the plurality of second voltage source leads to one another, and wherein the second voltage source rail is spaced apart from the first subset of electrodes and the second subset of electrodes by the substrate.

7. The electroadhesive pad of claim 5, wherein the first subset of electrodes are arranged in a plurality of first subset branches and the second subset of electrodes are arranged in a plurality of second subset branches;

wherein each first subset branch of the plurality of first subset branches comprises two or more electrodes of the first subset of electrodes connected in series with one another and extending from the central region of the electroadhesive pad to the perimeter of the electroadhesive pad, wherein each first subset branch is directly connected to a respective first voltage source lead of the plurality of first voltage source leads;

wherein each second subset branch of the plurality of second subset branches comprises two or more electrodes of the second subset of electrodes connected in series with one another and extending from the central region of the electroadhesive pad to the perimeter of the electroadhesive pad, and wherein each second subset branch is directly connected to a respective second voltage source lead of the plurality of second voltage source leads.

8. The electroadhesive pad of claim 1, wherein the first electrical network is electrically insulated from the second electrical network.

9. The electroadhesive pad of claim 1, wherein the perimeter of the electroadhesive pad comprises a pair of perimeter sections that are positioned on opposing sides of the central region of the electroadhesive pad, wherein at least a threshold fraction of a frontal area of the electroadhesive pad is defined between each side of the central region and a respective perimeter section of the pair of perimeter sections, and wherein the threshold fraction is at least 10% and at most 90%.

10. The electroadhesive pad of claim 1, wherein the electroadhesive pad defines a middle region between each side of the central region and the perimeter, wherein the electroadhesive pad is configured to be severed along a cutline that extends through the middle region and maintain electrical connection between the first voltage source and at least a substantial portion of all electrodes of the first subset of electrodes that are positioned at least partially inside of the cutline and maintain electrical connection between the second voltage source and at least a substantial portion of all electrodes of the second subset of electrodes that are positioned at least partially inside of the cutline.

11. An electroadhesive end effector, comprising:

a plurality of the electroadhesive pads of claim 1 operatively supported relative to one another in an arrangement in which the plurality of electroadhesive pads collectively define a desired three-dimensional surface contour.

* * * * *